United States Patent
Ishii

(10) Patent No.: US 12,406,468 B2
(45) Date of Patent: Sep. 2, 2025

(54) INFORMATION PROCESSING APPARATUS AND INFORMATION PROCESSING METHOD

(71) Applicant: SONY GROUP CORPORATION, Tokyo (JP)

(72) Inventor: Masaaki Ishii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 17/757,451

(22) PCT Filed: Dec. 9, 2020

(86) PCT No.: PCT/JP2020/045759
§ 371 (c)(1),
(2) Date: Jun. 15, 2022

(87) PCT Pub. No.: WO2021/131685
PCT Pub. Date: Jul. 1, 2021

(65) Prior Publication Data
US 2023/0020725 A1 Jan. 19, 2023

(30) Foreign Application Priority Data

Dec. 23, 2019 (JP) ................. 2019-231544

(51) Int. Cl.
*G06V 10/762* (2022.01)
*G06T 7/70* (2017.01)

(52) U.S. Cl.
CPC .............. *G06V 10/762* (2022.01); *G06T 7/70* (2017.01); *G06T 2207/10028* (2013.01)

(58) Field of Classification Search
CPC ........ G06V 10/762; G06V 10/82; G06T 7/70; G06T 2207/10028
See application file for complete search history.

(56) References Cited

U.S. PATENT DOCUMENTS

| 8,379,969 | B2 | 2/2013 | Barrois et al. |
| 2010/0310154 | A1* | 12/2010 | Barrois ................ G01B 11/245 382/154 |

(Continued)

FOREIGN PATENT DOCUMENTS

| CN | 101896936 A | 11/2010 |
| CN | 106651901 A | 5/2017 |
| CN | 110210474 A | 9/2019 |
| CN | 110390346 A | 10/2019 |
| CN | 110428490 A | 11/2019 |
| DE | 102007048320 A | 5/2008 |

(Continued)

OTHER PUBLICATIONS

Schmidt, J., Wöhler, C., Krüger, L., Gövert, T., & Hermes, C. (2007, December). 3D scene segmentation and object tracking in multiocular image sequences. In International Conference on Computer Vision Systems: Proceedings. (Year: 2007).*

(Continued)

*Primary Examiner* — Stephen R Koziol
*Assistant Examiner* — Ashley L. Hytrek
(74) *Attorney, Agent, or Firm* — CHIP LAW GROUP

(57) ABSTRACT

An information processing apparatus estimates a presence area of an object and the number of objects on the basis of a captured image, generates point cloud data from distance measurement information acquired by a distance measuring sensor, and recognizes the object by determining a point cloud, which is a target of clustering, in the point cloud data generated and the number of clusters on the basis of the presence area of the object and the number of the objects, which are estimated, and performing clustering on the point cloud data.

18 Claims, 26 Drawing Sheets

(56) References Cited

U.S. PATENT DOCUMENTS

| | | | | |
|---|---|---|---|---|
| 2012/0002881 A1* | 1/2012 | Maeda | ................... | G06V 20/30 |
| | | | | 382/195 |
| 2019/0295266 A1* | 9/2019 | Fan | ........................... | G06T 7/37 |

FOREIGN PATENT DOCUMENTS

| | | | | |
|---|---|---|---|---|
| EP | 3121791 B1 * | 9/2019 | ............... | G06T 7/20 |
| JP | 2010-541112 A | 12/2010 | | |
| JP | 2019191991 A * | 10/2019 | | |
| WO | 2009/049774 A1 | 4/2009 | | |
| WO | WO-2019087581 A1 | 5/2019 | | |
| WO | WO-2021074660 A1 * | 4/2021 | | |

OTHER PUBLICATIONS

Schmidt, J., Wöhler, C., Krüger, L., Övert, T., & Hermes, C. (Dec. 2007). 3D scene segmentation and object tracking in multiocular image sequences. In International Conference on Computer Vision Systems: Proceedings. (Year: 2007).*

Gülagiz, F. K., & Sahin, S. (2017). Comparison of hierarchical and non-hierarchical clustering algorithms. International Journal of Computer Engineering and Information Technology, 9(1), 6. (Year: 2017).*

Ohtani, et al., "Pedestrian group division using the k-means ++ method for pedestrian detection by LIDAR", The 5th Symposium on Sensing Via Image Information, Jun. 12, 2019. (Year: 2019).*

Nishikawa, et al., "Position and Orientation Estimation for Grasping Target Objects by a Disaster Response Robot Based on Depth Camera Information", Forum on Information Technology, Sep. 12, 2018, pp. 121-122.

Ohtani, et al., "Pedestrian group division using the k-means ++ method for pedestrian detection by LIDAR", The 25th Symposium on Sensing Via Image Information, Jun. 12, 2019.

International Search Report and Written Opinion of PCT Application No. PCT/JP2020/045759, issued on Feb. 22, 2021, 09 pages of ISRWO.

* cited by examiner

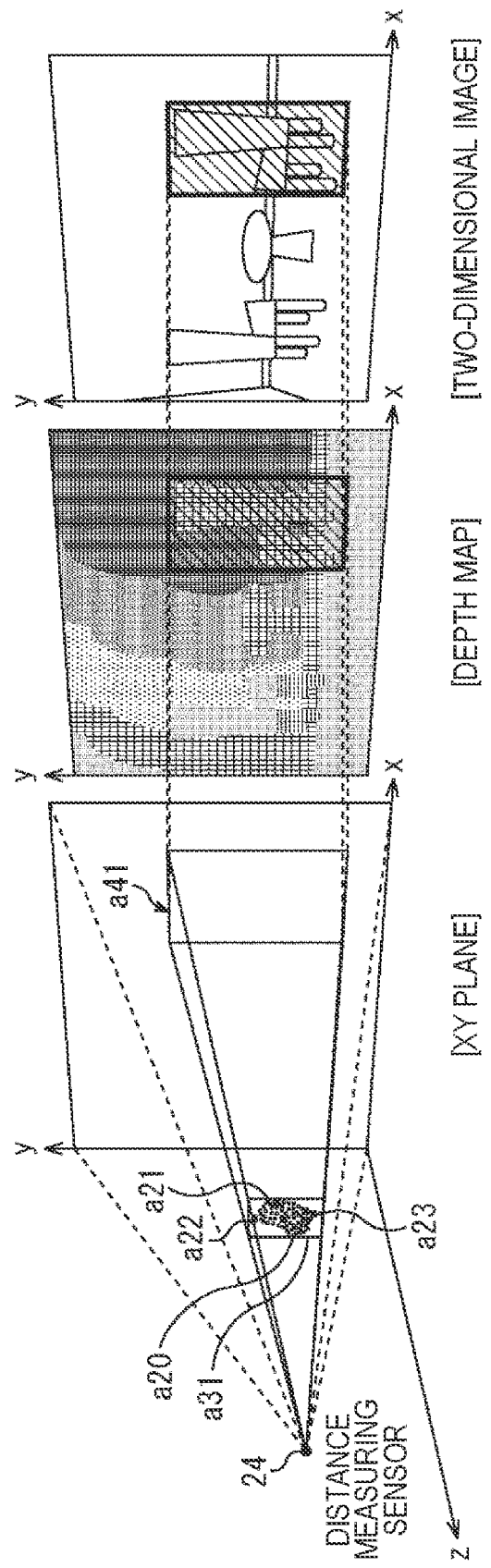

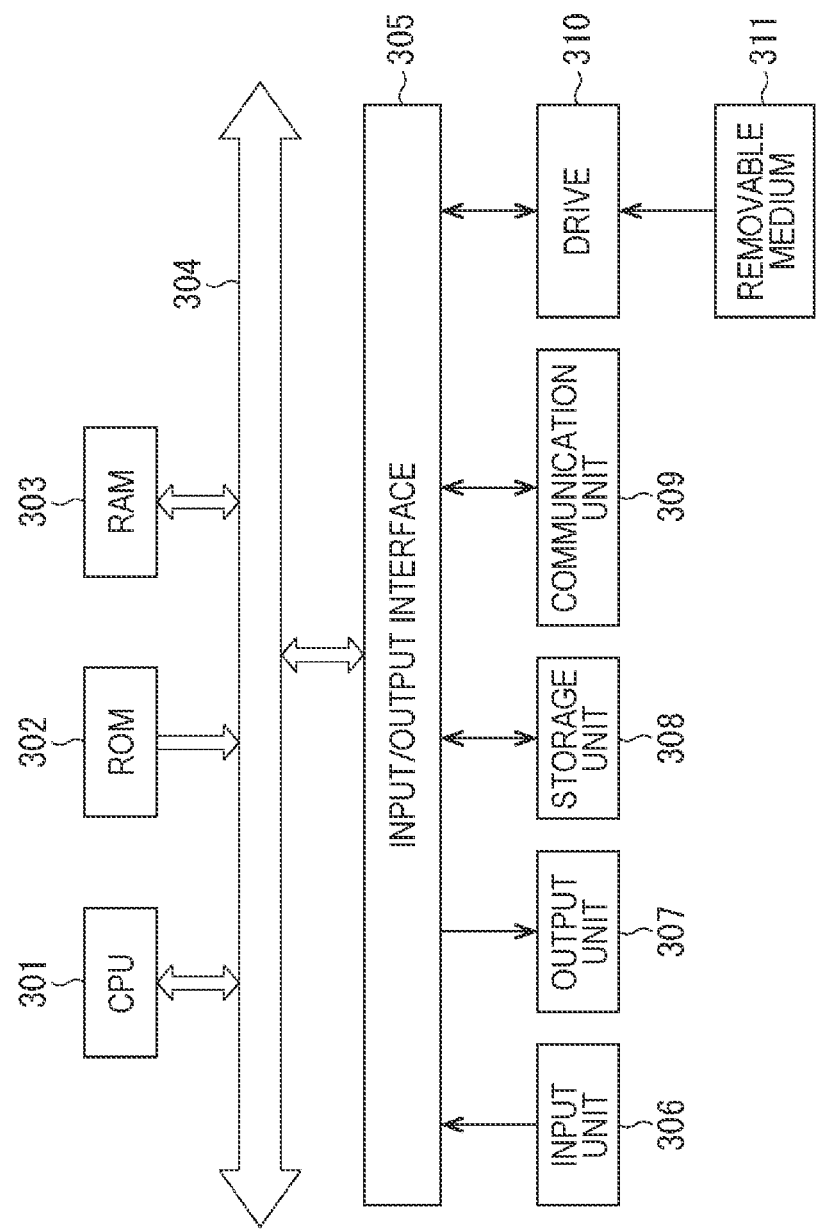

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/045759 filed on Dec. 9, 2020, which claims priority benefit of Japanese Patent Application No. JP 2019-231544 filed in the Japan Patent Office on Dec. 23, 2019. Each of the above-referenced applications is hereby incorporated herein by reference in its entirety.

TECHNICAL FIELD

The present technology relates to an information processing apparatus, an information processing method, and a program, and particularly relates to an information processing apparatus, an information processing method, and a program capable of improving the efficiency and accuracy of clustering.

BACKGROUND ART

The autonomous mobile robot needs to continue to accurately recognize, in a short time, the surrounding environment that changes from moment to moment due to its own movement or a moving object that is present around the autonomous mobile robot.

Examples of a method of recognizing the surrounding environment include a method of acquiring the surrounding environment as three-dimensional point cloud data using a distance measuring sensor capable of measuring a distance such as a stereo camera and clustering (hereinafter, also referred to as "point cloud clustering") the point cloud of the three-dimensional point cloud data into an object.

Meanwhile, since this point cloud clustering targets thousands or tens of thousands of points, the amount of calculation and the amount of data required for the process are very large. Accordingly, in a case where the process is performed in real time, a very high-performance processor is required. However, the high-performance processor consumes very large power.

On the other hand, in an autonomous mobile robot that is required to be reduced in weight, such as a battery-driven autonomous mobile robot or a drone, a processor for an embedded device with power consumption of about several tens to ten watts is used because there is a large restriction on power consumption such as a limited capacity of a battery. For this reason, the processing performance of clustering in the autonomous mobile robot is very limited.

However, the autonomous mobile robot also needs to continue to recognize the surrounding environment in real time in order to avoid a collision with a moving object such as a person. Consequently, even if the processing performance of the processor is limited, the real-time property of surrounding environment recognition cannot be greatly impaired.

Non-Patent Document 1 proposes a technique of clustering a point cloud into a cluster of pedestrians using a k-means++ method obtained by improving a method of determining an initial value of a k-means method.

Patent Document 1 proposes a technique of generating three-dimensional point cloud data from two images by a stereo method, and generating an attention map indicating a presence probability of a presence position of an object from at least one image by using machine learning.

CITATION LIST

Non-Patent Document

Non-Patent Document 1: Shunsuke OTANI and Shuichi ENOKIDA, "Pedestrian Grouping Using K-means++ Method for Pedestrian Detection by LIDAR", [online], Jun. 12, 2019, SSII 2019 (25th Image Sensing Symposium), [searched on Dec. 20, 2019], Internet <URL: https://confit.atlas.jp/guide/event/ssii2019/subject/IS1-04/detail>

Patent Document

Patent Document 1: U.S. Pat. No. 8,379,969

SUMMARY OF THE INVENTION

Problems to be Solved by the Invention

However, in the technique described in Non-Patent Document 1, since the center point is randomly selected, it is difficult to stably improve the convergence speed of a point cloud to a cluster cloud. In addition, since the attention map described in Patent Document 1 does not explicitly estimate the center of an object, the accuracy of estimation results of the number and positions of objects is low, and the accuracy of clustering based on these estimation results is not good.

The present technology has been made in view of such a situation, and an object thereof is to improve the efficiency and accuracy of clustering.

Solutions to Problems

An information processing apparatus according to one aspect of the present technology includes an object detection unit that estimates a presence area of an object and a number of objects on the basis of a captured image, a signal processing unit that generates point cloud data from distance measurement information acquired by a distance measuring sensor, and an object recognition unit that recognizes the object by determining a point cloud, which is a target of clustering, in the point cloud data generated and a number of clusters on the basis of the presence area of the object and the number of the objects, which are estimated, and performing clustering on the point cloud data.

In one aspect of the present technology, the presence area of the object and the number of objects are estimated on the basis of the captured image, and the point cloud data is generated from the distance measurement information acquired by the distance measuring sensor. The point cloud to be clustered in the generated point cloud data and the number of clusters are determined on the basis of the estimated presence area of the object and the estimated number of objects, and clustering is performed on the point cloud data, so that the object is recognized.

BRIEF DESCRIPTION OF DRAWINGS

FIG. 17 is a diagram illustrating an example of projection of a cluster area onto an XY plane and a positional relationship between the depth map and the two-dimensional image.

FIG. 26 is a block diagram illustrating a configuration example of a computer.

MODE FOR CARRYING OUT THE INVENTION

Figure 1:
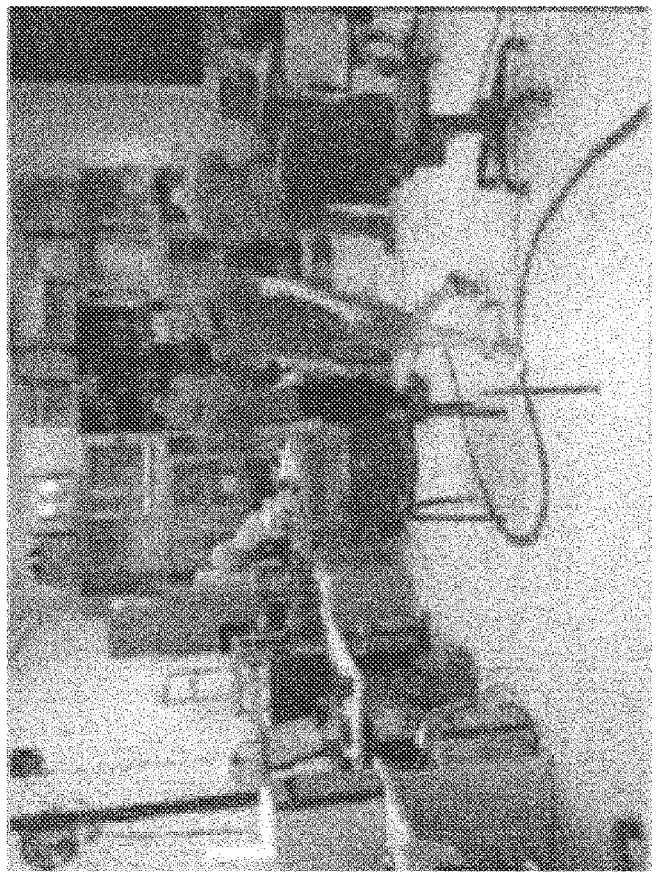
FIG. 1 is a diagram illustrating an example of a two-dimensional image.

Hereinafter, modes for carrying out the present technology will be described. The description will be given in the following order.

0. Overview of present technology
1. First embodiment (basic embodiment)
2. Second embodiment (prioritization of object detection)
3. Third embodiment (accuracy classification of object detection)
4. Others

0. Overview of Present Technology

Background

The development of sensor technology and artificial intelligence technology in recent years has led to the active development of autonomous mobile robots that autonomously move in a living space of a person, such as security robots and transport robots.

In general, in order for an autonomous mobile robot to autonomously move, it is necessary to create a map representing position information of an obstacle and to estimate a self-position on the map. However, in order to create a map, the autonomous mobile robot needs to recognize the surrounding environment, such as the position of an object.

In the autonomous mobile robot, an object present in the surroundings can be detected by scanning the surroundings thoroughly with a distance measuring sensor capable of measuring a distance to the object, such as a stereo camera or a time of flight (TOF) distance image sensor.

However, only a point cloud in which an infinite number of points each of which represents a certain point in the object are collected can be obtained by scanning with the distance measuring sensor, and what type of object is present remains unclear. For this reason, the individual points are grouped into objects, that is, clustering is performed, and a cluster (a set of points constituting an object) obtained as a result is associated with a meaning of an object such as a desk, a chair, a floor, a wall, or a ceiling, so that the object present in the surroundings is recognized.

Meanwhile, since this point cloud clustering targets thousands or tens of thousands of points, the amount of calculation and the amount of data required for the processing are very large, and when the processing is performed in real time, a high-performance processor (CPU), a graphics processor (GPU), or the like is required. However, the power consumption of such a very high-performance processor is very large such as 100 watt to 300 watt class.

On the other hand, since the autonomous mobile robot is required to be reduced in weight such as a battery-driven robot or a drone, there is a large restriction on power consumption such as a limited capacity of a battery. Accordingly, in the autonomous mobile robot, a processor for an embedded device with power consumption of about several tens of watts to several watts is used instead of the high-performance and high-power consumption processor described above.

Because of these reasons, the processing performance of clustering in the autonomous mobile robot is very limited. However, the autonomous mobile robot needs to continue to recognize the surrounding environment in real time in order to avoid a collision with a moving object such as a person. Consequently, the real-time property of surrounding environment recognition cannot be greatly impaired, only because the processing performance of the processor is limited.

As described above, the autonomous mobile robot needs to perform point cloud clustering for recognizing the surrounding environment with very limited calculation performance without largely impairing the real-time property.

Accordingly, in the present technology, the presence area of an object and the number of objects are estimated on the basis of a captured image, and point cloud data is generated from distance measurement information acquired by a distance measuring sensor. The point cloud to be clustered in the generated point cloud data and the number of clusters are determined on the basis of the estimated presence area of the object and the estimated number of objects, and clustering is performed on the point cloud data, so that the object is recognized.

Therefore, the clustering process is made efficient, and the high-speed clustering process can be performed even with limited calculation performance.

<Improvement in Efficiency of Point Cloud Clustering>

In an autonomous mobile robot (hereinafter, also simply referred to as "robot"), it is not always necessary to continue to recognize all objects in the field of view of a mounted distance measuring sensor in real time. For example, as illustrated in FIGS. 1 and 2, a case is examined in which a robot travels to a shelf at the back of a room while avoiding people and objects in a room where there are people and objects in a mixed manner.

FIG. 1 is a diagram illustrating an example of a two-dimensional image.

FIG. 1 illustrates a two-dimensional image in which a space in a room where there are people and objects in a mixed manner is captured by an image sensor mounted on a robot.

Figure 2:
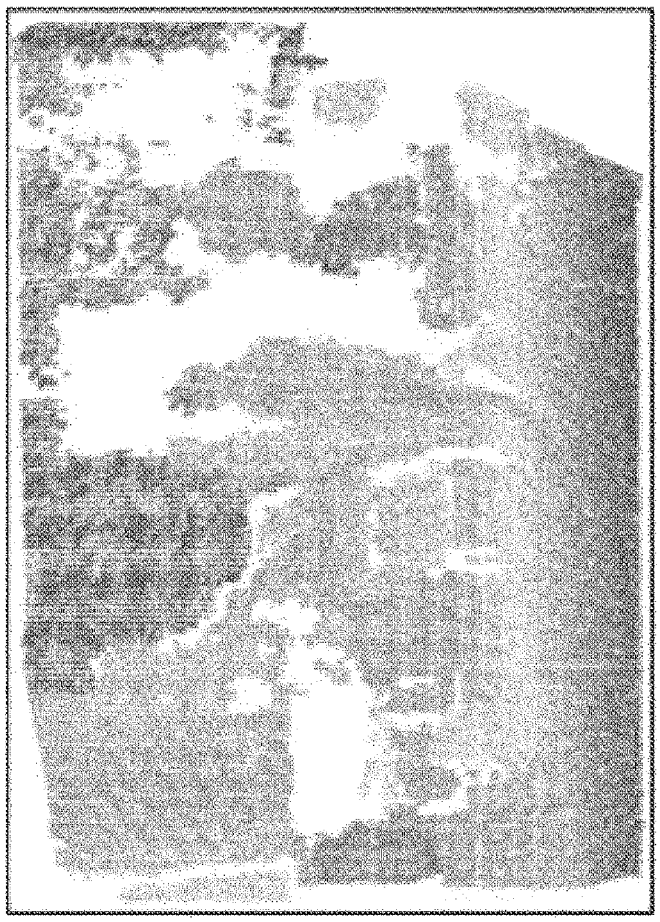
FIG. 2 is a diagram illustrating an example of a point cloud data image in which point cloud data is imaged.

FIG. 2 is a diagram illustrating an example of a point cloud data image in which point cloud data is imaged.

FIG. 2 illustrates a point cloud data image in which point cloud data obtained by scanning the space in the room corresponding to that of FIG. 1 using a distance measuring sensor mounted on a robot is imaged. In practice, different point clouds are colored in different colors depending on the distance from the robot.

Positions and sizes of objects shown in the two images of FIGS. 1 and 2 substantially match each other.

Objects such as "person, desk, chair, shelf, wall, and floor" are mainly present in the space of this room. Among these objects, the object that is the most obstacle in the movement of the robot and that should be paid the most attention to is "person" whose position may change frequently. Accordingly, "person" has a high priority as a detection target, and needs to be recognized in real time every time scanning is performed by the distance measuring sensor.

On the other hand, since "desk and chair" are objects that are present near the robot but do not move or are unlikely to move, these objects have a low priority as a detection target, and are only required to be recognized at a low frequency such as once per several scans.

Furthermore, "shelf" at the back (far) of the space may be excluded from the target of recognition for a while since it is still later for the robot to reach the vicinity of the back of the space.

From the above, the object to be recognized in real time in this space can be limited to "person", and the robot can increase the frequency of recognition of "person" and reduce the frequency of recognition of all the objects other than "person".

Figure 3:
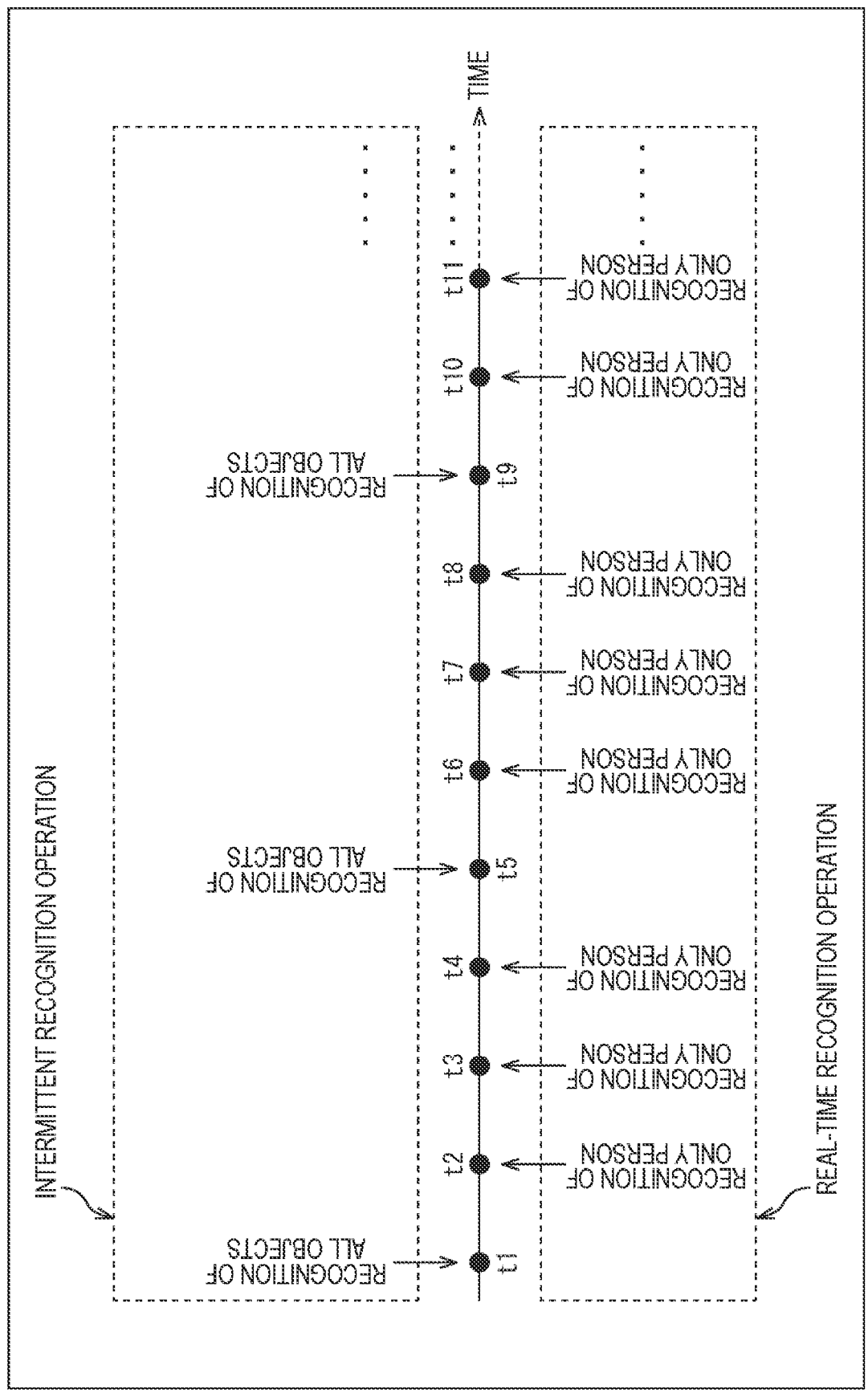
FIG. 3 is a diagram illustrating an example of the timing of surrounding environment recognition by a robot.

FIG. 3 is a diagram illustrating an example of the timing of recognition of a surrounding environment by a robot.

In FIG. 3, the horizontal axis represents time, and the recognition operation is performed at regular intervals. In the upper part, the timing of an operation of recognizing all objects is illustrated as an intermittent recognition operation. In the lower part, the timing of an operation of recognizing only a person is illustrated.

The operation of recognizing all the objects is performed at each of timings of a time t1, a time t5, and a time t9, and the operation of recognizing only a person is performed at each of timings of times t2 to t4, times t6 to t8, a time t10, and a time t11.

That is, the robot scans the surrounding space at regular intervals. Since the operation of recognizing all the objects also includes a person recognition operation, the person recognition operation is performed for each scan. On the other hand, the recognition of all objects is performed every several (in FIG. 3, four) scans, that is, intermittently.

In either recognition operation, it is possible to exclude an object located far from the robot. Regarding what distance is determined as being far from the robot, for example, the distance exceeding the braking distance at the moving speed of the robot at that time is set so that the collision with the object can be avoided.

<Narrow Down of Point Cloud to be Clustered>

In order to narrow down a point cloud to be clustered to a point cloud related to an object to be recognized, it is necessary to limit the object to be recognized. Accordingly, in order for a robot to recognize surrounding objects, image recognition based on machine learning is used.

For the image recognition based on machine learning, for example, a convolutional neural network (CNN) for object detection represented by regions with convolutional neural networks (R-CNN), you look only once (YOLO), single shot multibox detector (SSD), or the like is used.

These object detection CNNs detect the type of an object present in a room and the area of the object on an image from a two-dimensional image obtained by capturing a space with an image sensor.

Figure 4:
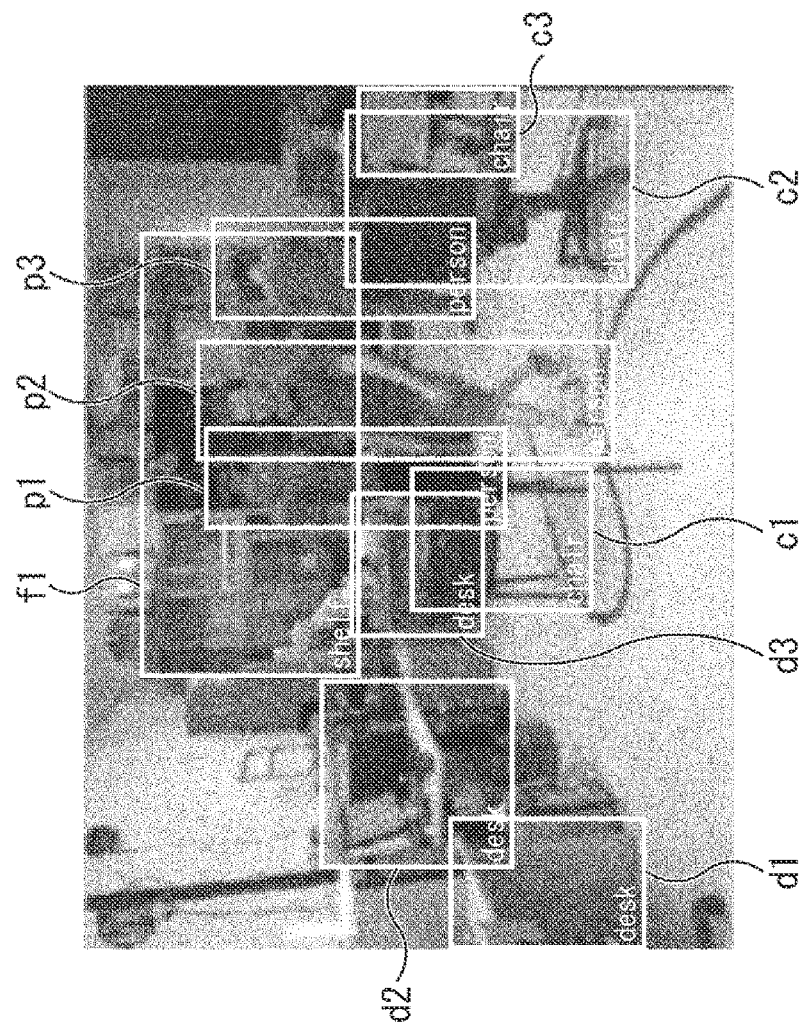
FIG. 4 is a diagram illustrating an example of a detection result by an object detection CNN.

FIG. 4 is a diagram illustrating an example of a detection result by an object detection CNN.

FIG. 4 illustrates the type of each object and a quadrangular frame (hereinafter, referred to as "bounding box") surrounding an area where an object is present, which are detected by the object detection CNN from the two-dimensional image illustrated in FIG. 1.

Bounding boxes $d1$ to $d3$ each surround "desk" that is a detected object, and the bounding boxes $d1$ to $d3$ also indicate that the type of the object is "desk (character string)". A bounding box $f1$ surrounds "shelf" that is a detected object, and the bounding box $f1$ indicates that the type of the object is "shelf (character string)".

Bounding boxes $p1$ to $p3$ each surround "person" that is a detected object, and the bounding boxes $p1$ to $p3$ indicate that the type of the object is "person (character string)". Bounding boxes $c1$ to $c3$ each surround "chair" that is a detected object, and the bounding boxes $c1$ to $c3$ indicate that the type of the object is "chair (character string)".

As illustrated in FIG. 4, if the area where the object is present can be grasped by the object detection CNN, the point cloud to be clustered can be narrowed down.

Hereinafter, in order to simplify the description, it is assumed that positions and sizes of objects shown in the two-dimensional image (FIG. 1) captured by the image sensor and the point cloud data image (FIG. 2) obtained by scanning with the distance measuring sensor substantially match each other. In addition, the description will be given assuming that the image capturing timing of the image sensor and the timing when the point cloud data is generated from the scan result of the distance measuring sensor are synchronized with each other.

First, in the operation of recognizing all objects, the point cloud in the presence area of each object detected by the object detection CNN is a clustering target.

Figure 5:
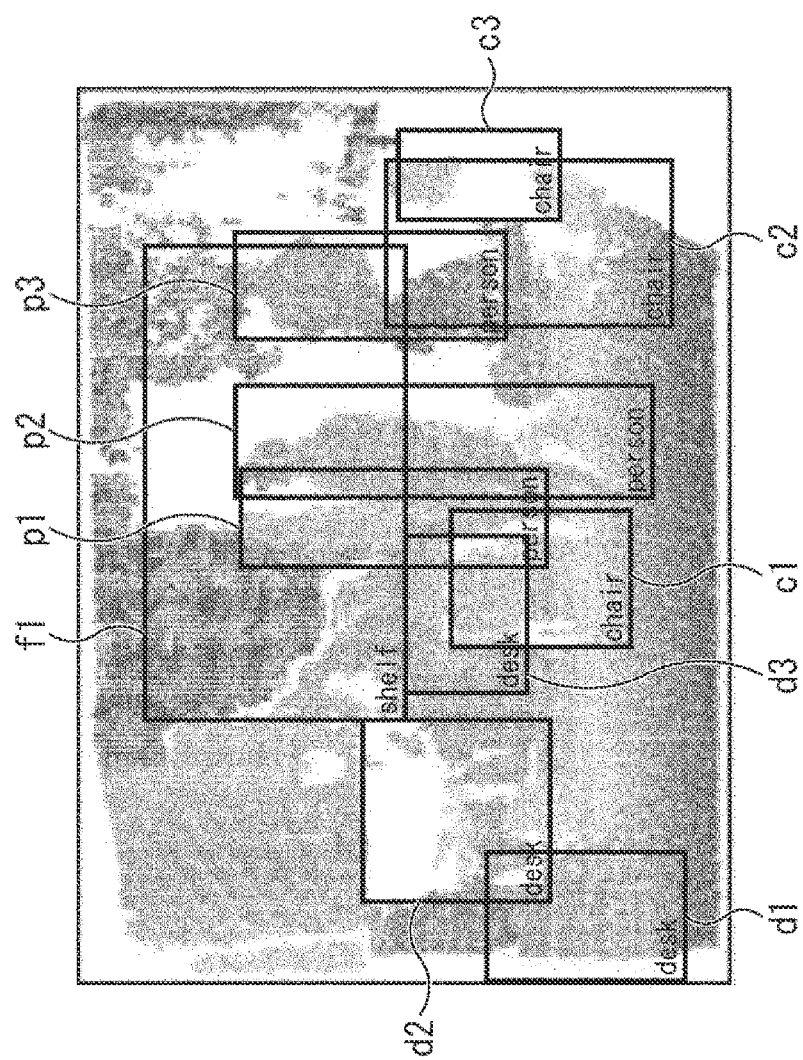
FIG. 5 is a diagram illustrating an example in which a bounding box, which is a detection result detected by the object detection CNN, is superimposed on the point cloud data image.

FIG. 5 is a diagram illustrating an example in which a bounding box, which is a detection result detected by the object detection CNN described above with reference to FIG. 4, is superimposed on the point cloud data image.

In the operation of recognizing all objects, as illustrated in FIG. 5, the point cloud included in each bounding box is a clustering target. That is, the point clouds included in the bounding boxes d1 to d3, the bounding box f1, the bounding boxes p1 to p3, and the bounding boxes c1 to c3 are clustering targets. However, as described above, the point cloud in the presence area of an object distant from the robot is excluded from the clustering target.

Figure 6:
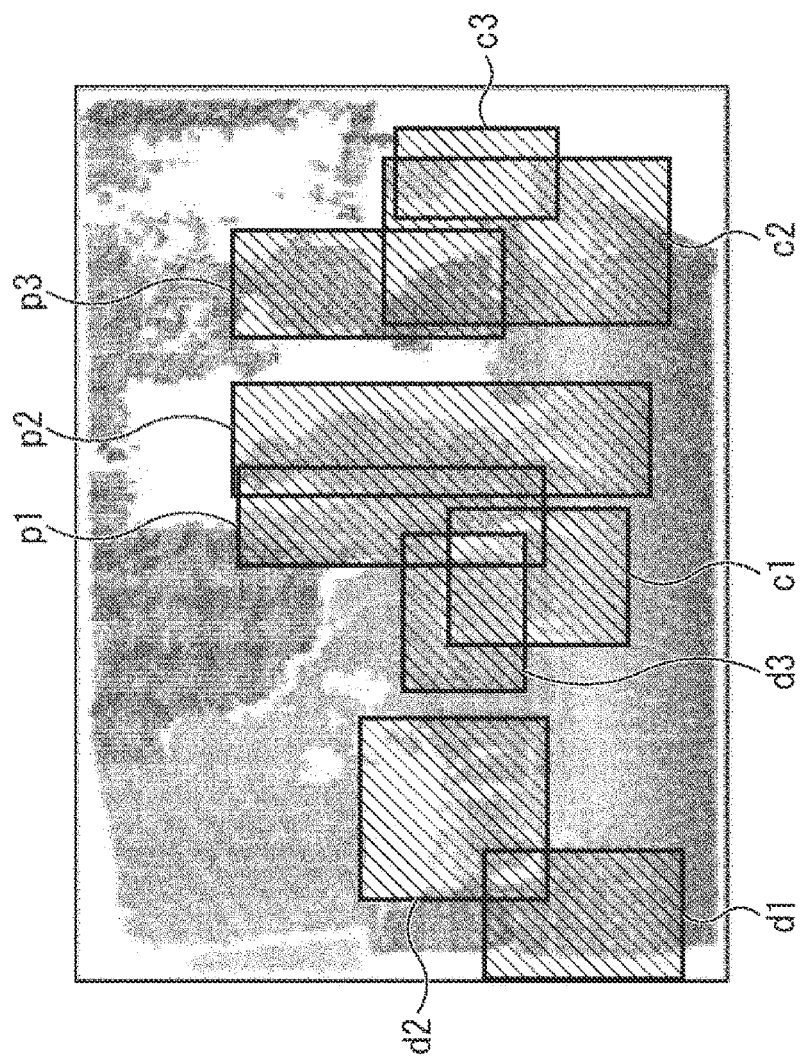
FIG. 6 is a diagram illustrating an example of a point cloud, which is a final clustering target.

FIG. 6 is a diagram illustrating an example of a point cloud, which is a final clustering target, in the operation of recognizing all objects.

In FIG. 6, the point cloud in the presence area of an object distant from the robot is excluded from the point clouds included in the individual bounding boxes in FIG. 5. That is, the point cloud included in the bounding box f1 is excluded from the clustering target.

As a result, as shown in hatched areas in FIG. 6, the point clouds to be clustered are the point clouds included in the bounding boxes d1 to d3, the bounding boxes p1 to p3, and the bounding boxes c1 to c3.

On the other hand, in the operation of recognizing only a person in real time, the point clouds belonging to the bounding boxes P1 to P3 indicating "person" detected by the object detection CNN are the clustering targets.

Figure 7:
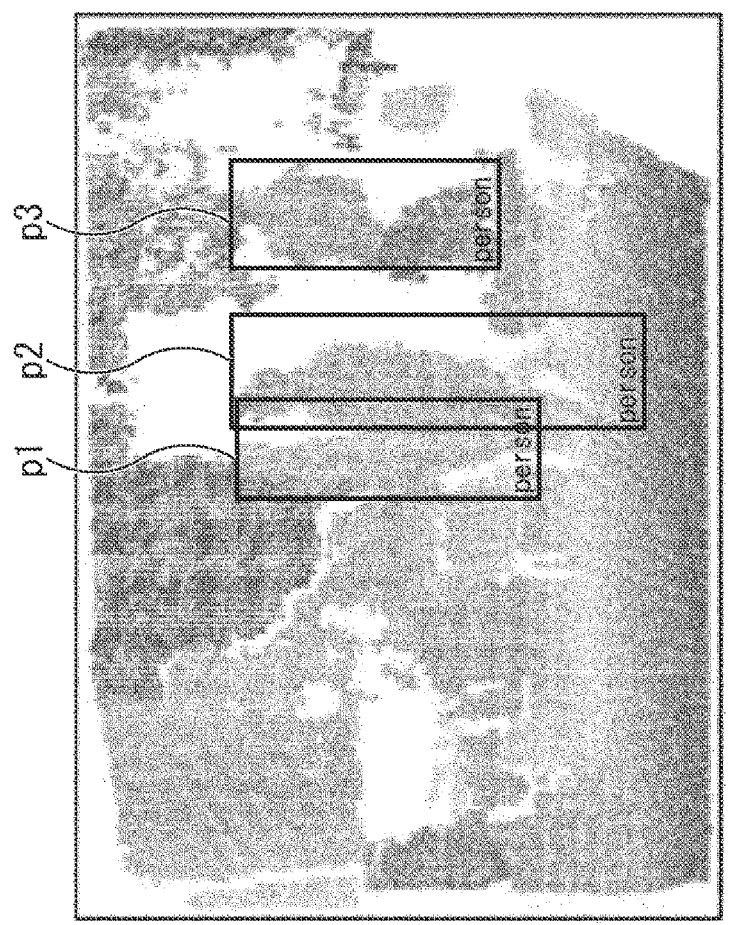
FIG. 7 is a diagram illustrating an example in which the bounding box, which is a detection result detected by the object detection CNN, is superimposed on a point cloud data image in the case of real-time recognition of only a person.

FIG. 7 is a diagram illustrating an example of a point cloud to be clustered in the operation of recognizing only a person in real time.

Since only a person is a recognition target, the point clouds included in the bounding boxes p1 to p3 are the clustering targets in FIG. 7. However, as described above, the point cloud in the presence area of an object distant from the robot is excluded from the clustering target.

Figure 8:
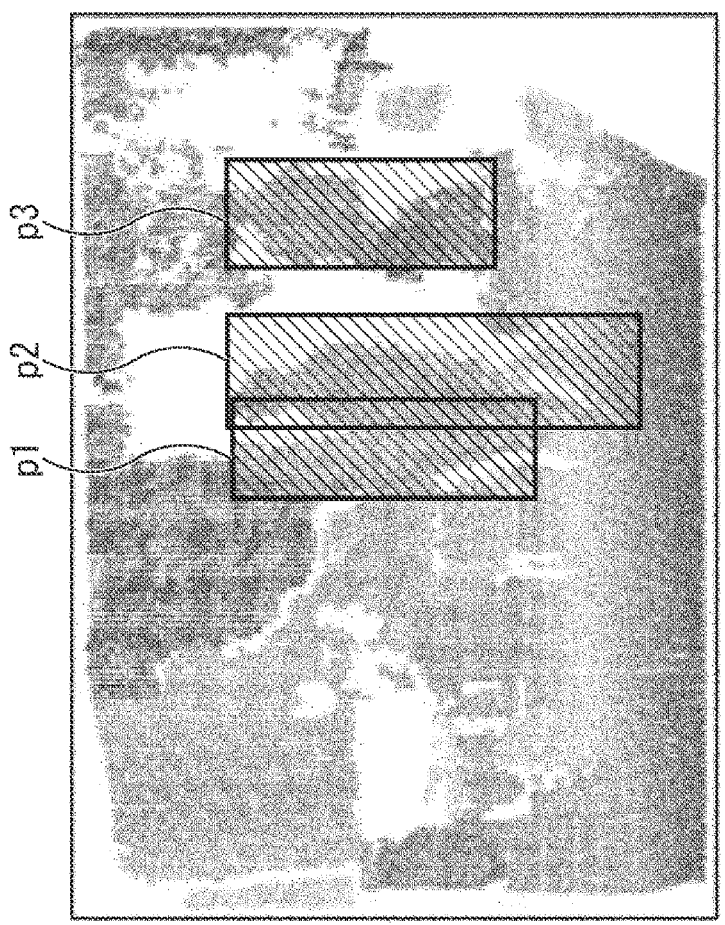
FIG. 8 is a diagram illustrating an example of a point cloud, which is a final clustering target, in the case of the real-time recognition of only a person.

FIG. 8 is a diagram illustrating an example of a point cloud, which is a final clustering target, in the case of recognition operation of only a person in real time.

In this example, since "person" is not detected at a location far from the robot, the point clouds included in the bounding boxes p1 to p3 as illustrated in the hatched areas are the clustering targets without being excluded from the detection result of FIG. 7.

As described above, the point cloud to be clustered is further narrowed down in the case of the operation of recognizing only a person (FIG. 8) as compared with the case of the operation of recognizing all objects (FIG. 6). Therefore, it is suitable for recognition in real time with less time available for the clustering process.

<Determination of Starting Point of Clustering and Number of Clusters>

Next, the robot performs clustering on a narrowed point cloud to generate a cluster. There are various methods for clustering, but in the present specification, "k-means method", which is conceived to have a high calculation speed, is used among the clustering methods.

The k-means method has an advantage that the calculation speed is fast, but has a disadvantage that the quality of the clustering result largely depends on the initial value (the starting point of clustering) and the optimum number of clusters cannot be determined. However, in the present technology, by using the object detection result of the object detection CNN, it is possible to determine the optimal starting point of clustering and the optimal number of clusters, and to compensate for the disadvantage described above.

The k-means method has a characteristic of assuming each cluster center at the start (the starting point) of clustering and then repeating allocation of the cluster center and a point cloud to each cluster. As for the starting point of clustering, it is optimal to select a point that is likely to be the cluster center, that is, a point near the center of an object, in view of the characteristics of the k-means method.

Figure 9C:
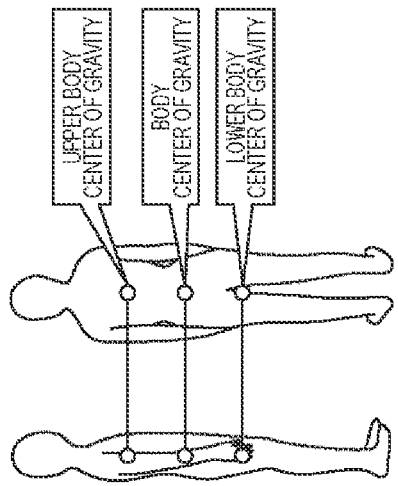
FIGS. 9A, 9B, and 9C are diagrams illustrating an example of definition of a center of an object.
Figure 9B:
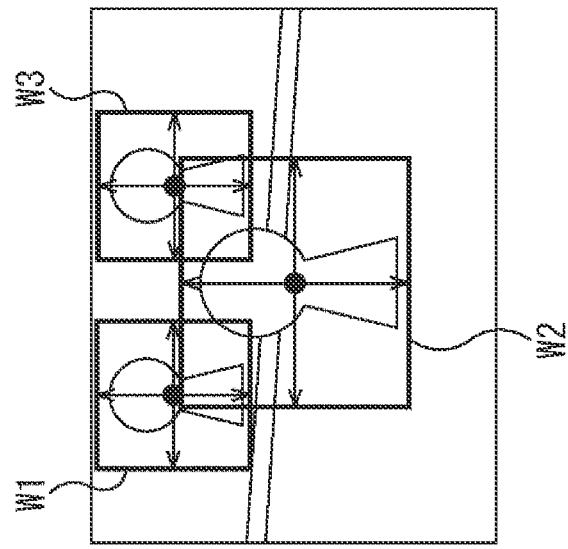
Figure 9A:
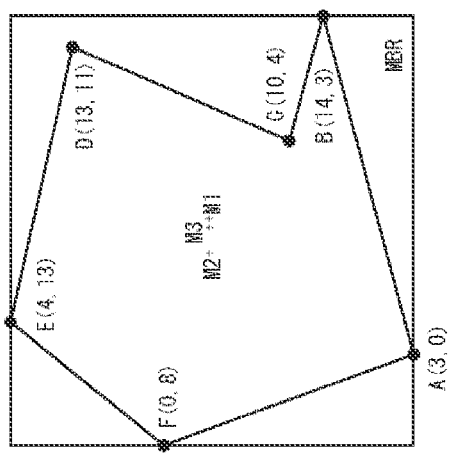

FIGS. 9A, 9B, and 9C are diagrams illustrating an example of definition of a center of an object.

In FIG. 9A, a point M2, which is a geometric center of a polygon including vertices A to F, is illustrated as the geometric center.

Note that a point M1 is a point indicating the average of the coordinate values of the individual vertices of the polygon. A point M3 is a point indicating the center of a rectangle (that is, a bounding box) surrounding the polygon.

In FIG. 9B, centers of bounding boxes W1 to W3 each surrounding a person are indicated by black dots as simpler geometric centers.

In FIG. 9C, as the center of gravity of the object, the upper body center of gravity of the person, the body center of gravity that is the midpoint between the upper body center of gravity and the lower body center of gravity, and the lower body center of gravity are illustrated in order from the top.

As described above, the geometric center of the object (FIG. 9A), the center of the bounding box (FIG. 9B), the center of gravity of the object (FIG. 9C), and the like are conceived as the center of the object. Note that, in the object detection CNN, since a bounding box is generally obtained as the object detection result, it is optimal to use the center of the bounding box illustrated in FIG. 9B as the object center.

Whether or not the center of the object is the optimum center depends on the object detection method to be used, the application of the autonomous mobile robot, the characteristics of a movement space, or the like.

Figure 10:
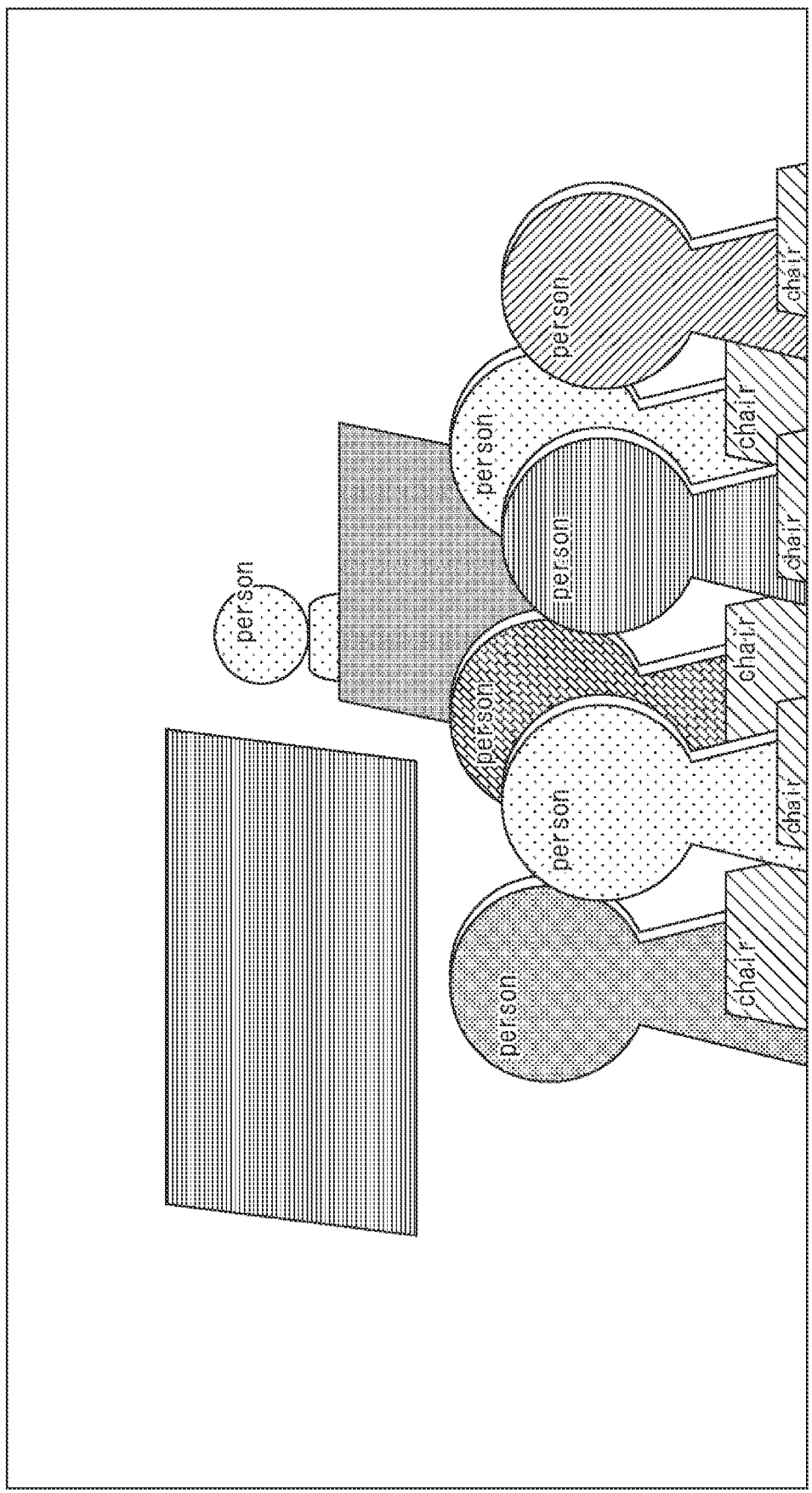
FIG. 10 is a diagram illustrating an example of object detection based on instance segmentation.

FIG. 10 is a diagram illustrating an example of object detection based on instance segmentation.

FIG. 10 illustrates an example in which the area along the contour of an object (a person or a chair) and the type of the object are detected by instance segmentation. In FIG. 10, the area (the hatched area) detected along the contour of a person or a chair is illustrated as an object, and the type of the object is indicated in alphabetical notation as "person" or "chair" in each area.

For example, from the viewpoint of the method of object detection based on machine learning, in object detection based on instance segmentation, the area along the contour of the object is detected as illustrated in FIG. 10, and thus the geometric center of the object in FIG. 9A is suitable.

Figure 11:
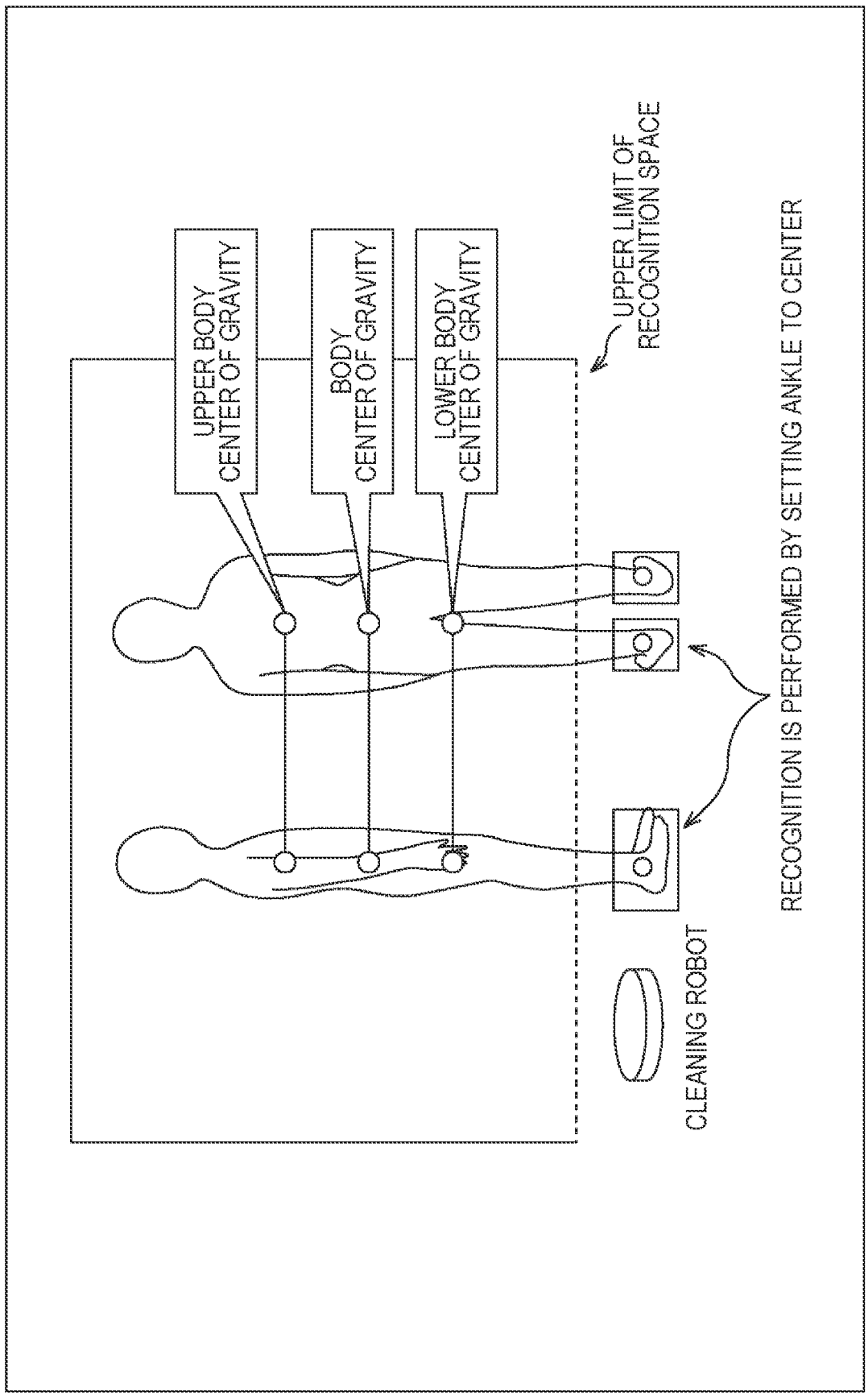
FIG. 11 is a diagram illustrating an example of definition of an object center in view of characteristics of a movement space.

FIG. 11 is a diagram illustrating an example of definition of an object center in view of characteristics of a movement space.

FIG. 11 illustrates a cleaning robot and a person. For a person as an object, the body center of gravity can be defined as the object center. However, the upper limit of the recognition space of the cleaning robot is around the calf of the person indicated by the broken line. Therefore, in terms of the characteristics of the movement space of the robot, it is sufficient to recognize a space to a height of about a person's foot as long as the robot is small and moves on the floor such as a cleaning robot, and thus, it is suitable to set the ankle portion to the object center.

Figure 12:
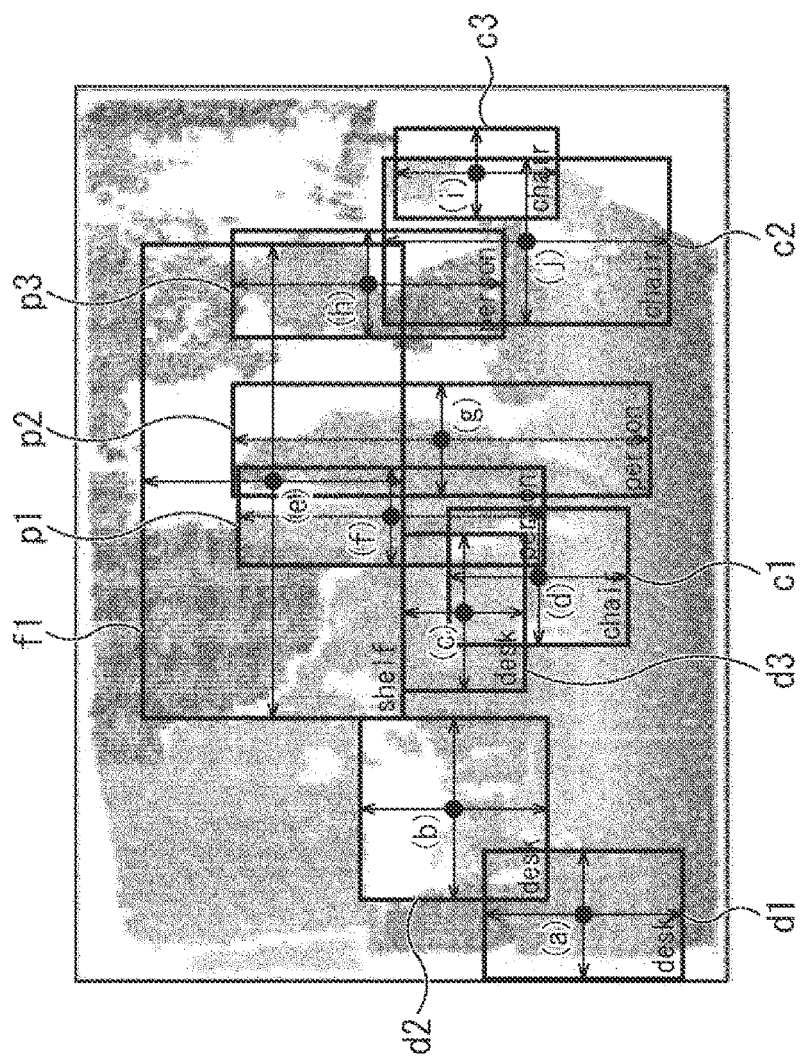
FIG. 12 is a diagram illustrating an example of an object detection area and a center.

FIG. 12 is a diagram illustrating an example of an object detection area and a center.

FIG. 12 illustrates an example in which the center of a bounding box is set to the center of an object in the object detection result of the object detection CNN in FIG. 5.

A black circle in each bounding box indicates the center of each bounding box. Specifically, a center (a) of the bounding box d1, a center (b) of the bounding box d2, a center (c) of the bounding box d3, and a center (d) of the bounding box c1 are illustrated. Furthermore, a center (e) of the bounding box f1, a center (f) of the bounding box p1, a center (g) of the bounding box p2, a center (h) of the bounding box p3, a center (i) of the bounding box c2, and a center (j) of the bounding box c3 are also illustrated.

The centers (a) to (j) of these bounding boxes are set to the center of the object.

Figure 13:
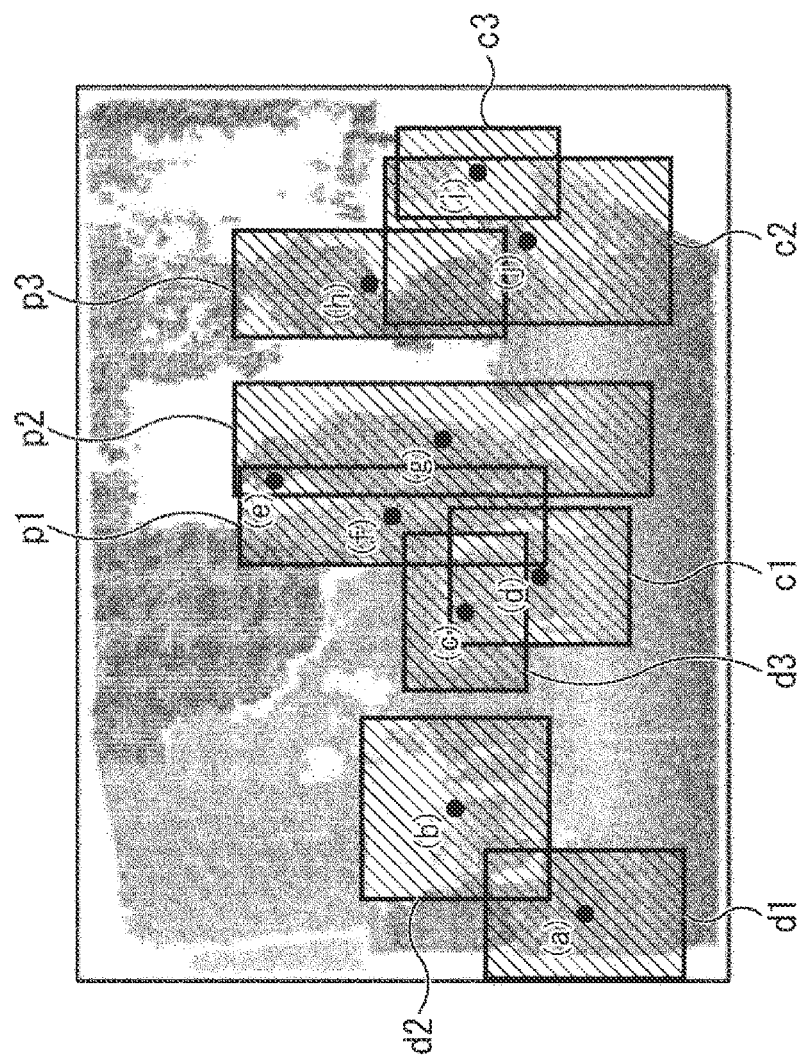
FIG. 13 is a diagram illustrating an example of a point cloud to be clustered and a starting point of clustering.

FIG. 13 is a diagram illustrating an example of a point cloud to be clustered and a starting point of clustering.

In a case where the center of a bounding box is set to the center of an object, the starting point of clustering is a point in the vicinity of each of the centers (a) to (j) in FIG. 13.

Note that the center (e) is the center of the bounding box f1 of a shelf, and "shelf" is located distant and is out of detection, but a point cloud of "person", which is the bounding box p2, is present in the vicinity, and thus "shelf" belongs to "person", which is the bounding box p2. Accordingly, since points belonging to the same "person" are selected for the center (e) and the center (g), two different clustering may be performed on the same "person".

In this case, for example, by using data in view of the covariance of data such as the Mahalanobis distance as an inter-cluster distance, clusters with a very high possibility of the same cluster can be integrated into one cluster.

There is no point cloud in the vicinity of the center (i). In this case, the detection target area may be expanded, and the point found first may be set to the starting point (It is merely a starting point, and thus does not need to be strictly aligned with the center of the object).

In the present specification, since the object detection CNN estimates the bounding box, the center of the bounding box is set to the object center. However, in recent years, an object detection CNN that directly estimates the center of an object and further estimates the bounding box, such as CenterNet has been proposed. By using such an object detection CNN, efficient object detection is possible. Note that, there are Object as points and <https://arxiv.org/abs/1904.07850> as references to CenterNet.

It is only required that the number of clusters is the number of objects detected in the object detection CNN. In the case of FIG. 5, since the total number of "person, desk, chair, and shelf" is ten, the number of clusters is ten.

Here, since "shelf" is a distant object and is out of a recognition target, there is one extra cluster, but the extra cluster is integrated into any cluster by performing the clustering described above. Accordingly, extra clusters do not become a problem.

By setting the number of clusters close to the number of objects, it is possible to avoid that the number of clusters is too small and thus a plurality of objects is erroneously integrated, or the number of clusters is excessive and thus a large amount of objects overflow, and as a result, clusters can be generated with high accuracy.

As described above, since the object is detected by the machine learning method and the point cloud clustering is performed on the basis of the result, the clustering is made efficient and the accuracy of the cluster is improved. Therefore, even in a system with very limited calculation performance such as an autonomous mobile robot system, the point cloud clustering for recognizing the surrounding environment can be performed without largely impairing the real-time property.

Hereinafter, a system configuration for achieving an improvement in the efficiency of the point cloud clustering described above will be described.

1. First Embodiment (Basic Embodiment)

<Configuration Example of Autonomous Mobile Robot System>

Figure 14:
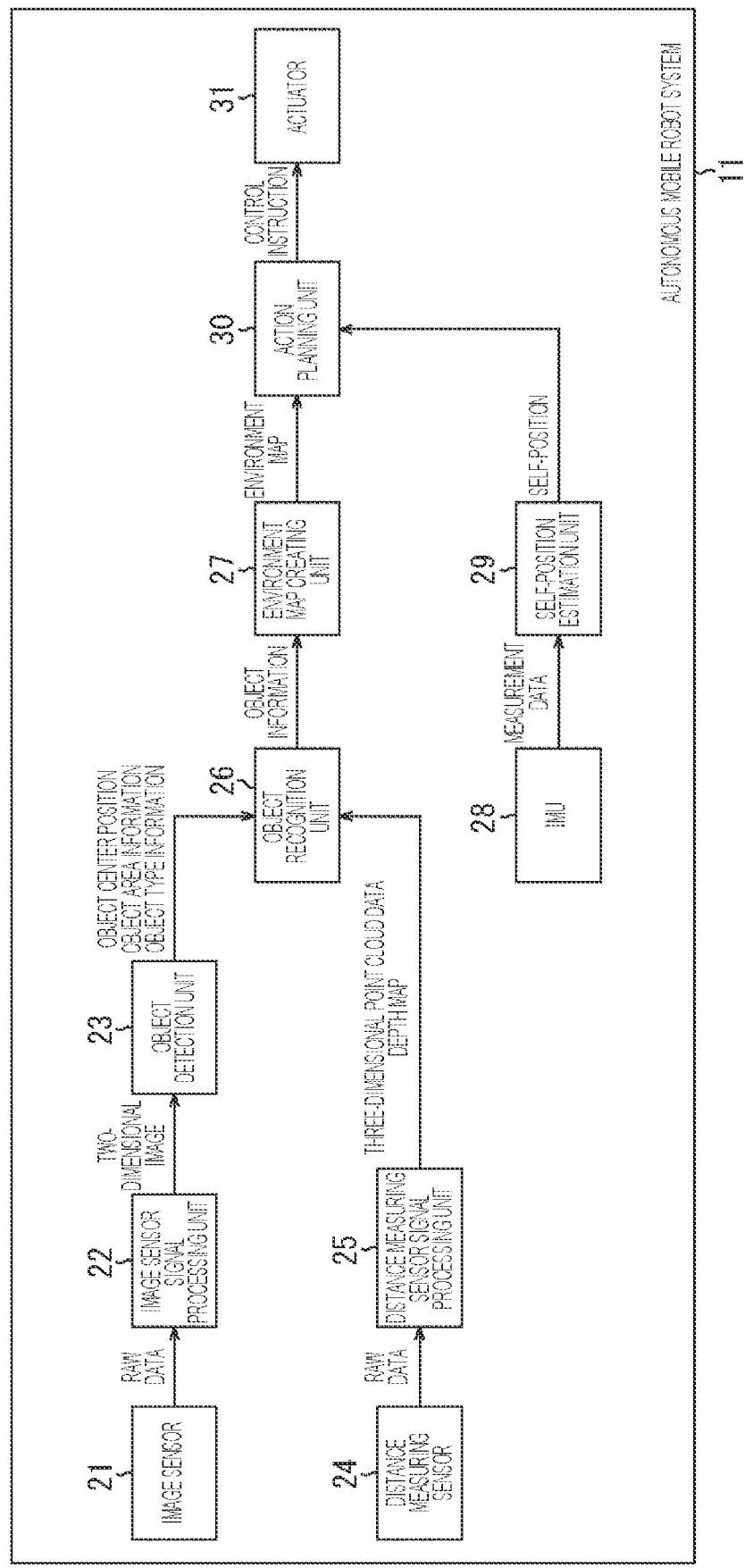
FIG. 14 is a diagram illustrating a configuration example of an autonomous mobile robot system according to a first embodiment of the present technology.

FIG. 14 is a diagram illustrating a configuration example of an autonomous mobile robot system according to a first embodiment of the present technology.

An autonomous mobile robot system 11 scans a surrounding space with various sensors, recognizes a surrounding object and estimates a self-position from a scan result, and creates a surrounding environment map from a result of the object recognition. Then, the autonomous mobile robot system 11 determines a movement route on the basis of the environment map and the estimation result of the self-position, and controls an actuator so as to allow a robot body to move along the determined movement route.

In the autonomous mobile robot system 11, as described above, in performing object detection based on the machine learning method, the center position and the area of an object are estimated, and the three-dimensional point cloud is efficiently clustered on the basis of the estimation result.

The autonomous mobile robot system 11 includes an image sensor 21, an image sensor signal processing unit 22, an object detection unit 23, a distance measuring sensor 24, a distance measuring sensor signal processing unit 25, and an object recognition unit 26. Furthermore, the autonomous mobile robot system 11 also includes an environment map creating unit 27, an inertial measurement unit (IMU) 28, a self-position estimation unit 29, an action planning unit 30, and an actuator 31.

The image sensor 21 is an image sensor for scanning the front space in a traveling direction as an image. The image-capturing space is the same as the scan space of the distance measuring sensor 24. The image-capturing timing is synchronized with the scan timing of the distance measuring sensor 24. The image sensor 21 captures a subject and generates an image of the subject. The image sensor 21 outputs RAW data of the image of the subject to the image sensor signal processing unit 22.

The image sensor signal processing unit 22 is a block that converts RAW data into a two-dimensional image. The image sensor signal processing unit 22 performs various types of signal processing such as lens correction and noise removal on the RAW data supplied from the image sensor 21 to generate a two-dimensional image. The image sensor signal processing unit 22 outputs the generated two-dimensional image to the object detection unit 23.

The object detection unit 23 is a block that detects an object in a surrounding space on the basis of a two-dimensional image. On the basis of the two-dimensional image supplied from the image sensor signal processing unit 22, the object detection unit 23 estimates an object center position, an object area, and an object type for each object using an object detection method based on machine learning such as a convolutional neural network (CNN).

For each object, the object center position, the object area information, and the object type information are output to the object recognition unit 26 as detection results. The number of objects is the number of detected objects.

The object center position is the geometric center of the object, the center of gravity of the object, the center of a bounding box, or the like, and is represented by a pixel position in a two-dimensional image. The object area information is information indicating an area including an image in which the object is shown, and is represented as a quadrangular frame (a bounding box) including upper, lower, left, and right ends of the object as sides. The object type information is information indicating the type of the object, and is represented as a character string (person, chair) of the object name or an identification number assigned to the object in advance.

The distance measuring sensor 24 is a sensor that scans the distance to an object in a space in the traveling direction. A sensor such as a stereo camera, a TOF distance image sensor, or a light detection and ranging or laser detection and ranging (LIDAR) is used as the distance measuring sensor 24. The scan space is the same as the image-capturing space of the image sensor 21. The scan timing is synchronized with the image-capturing timing of the image sensor 21. The distance measuring sensor 24 outputs RAW data of the scan result to the distance measuring sensor signal processing unit 25.

The distance measuring sensor signal processing unit 25 is a block that generates three-dimensional point cloud data and a depth map on the basis of RAW data of a scan result. The distance measuring sensor signal processing unit 25 performs various types of filtering processes necessary for generating the point cloud data and the depth map on the RAW data supplied from the distance measuring sensor 24 to generate the three-dimensional point cloud data and the depth map. The depth map represents the distance to an object scanned by the distance measuring sensor 24 as two-dimensional map data (see FIG. 16B to be described later). The distance measuring sensor signal processing unit 25 outputs the generated three-dimensional point cloud data and the generated depth map to the object recognition unit 26.

The object recognition unit 26 is a block that recognizes an object in the surrounding space scanned by the image sensor 21 and the distance measuring sensor 24. The object recognition unit 26 receives the object center position, the object area information, and the object type information that are the detection results supplied from the object detection unit 23, and also receives the three-dimensional point cloud data and the depth map supplied from the distance measuring sensor signal processing unit 25. The object recognition unit 26 generates object information by using the received information, and outputs the generated object information to the environment map creating unit 27.

The environment map creating unit 27 is a block that creates an environment map representing objects and the like present in the surroundings on the basis of the object information supplied from the object recognition unit 26. The environment map creating unit 27 receives the object information supplied from the object recognition unit 26, converts the position and shape of the object into the coordinate system of the environment map, and then records the position, shape, and type of the object as map information, thereby creating the environment map. The environment map creating unit 27 outputs the created environment map to the action planning unit 30.

The IMU 28 is a block that measures an angular velocity and an acceleration for each three-dimensional axis. The IMU 28 outputs measurement data of the measurement result to the self-position estimation unit 29.

The self-position estimation unit 29 is a block that estimates a self-position on the basis of a moving distance up to the present. The self-position estimation unit 29 receives the measurement data of the angular velocity and the acceleration in each three-dimensional axis supplied from the IMU 28, continues to calculate the movement distance in each three-dimensional direction, and estimates the current self-position. The self-position estimation unit 29 outputs self-position information indicating the estimated self-position to the action planning unit 30.

The action planning unit 30 is a block that determines a movement route to a destination and instructs the actuator 31 to control a robot body to move along the movement route. The action planning unit 30 receives the environment map supplied from the environment map creating unit 27 and also receives the self-position information supplied from the self-position estimation unit 29. The action planning unit 30 calculates the amount of movement in each two-dimensional direction up to the next time point using the received information, and determines a control instruction to the actuator 31. The action planning unit 30 outputs the determined control instruction to the actuator 31.

The actuator 31 is a block that controls a drive device such as a motor. The actuator 31 receives the control instruction supplied from the action planning unit 30, and controls a drive device such as a motor until the required amount of movement is obtained.

<Configuration of Object Recognition Unit>

Figure 15:
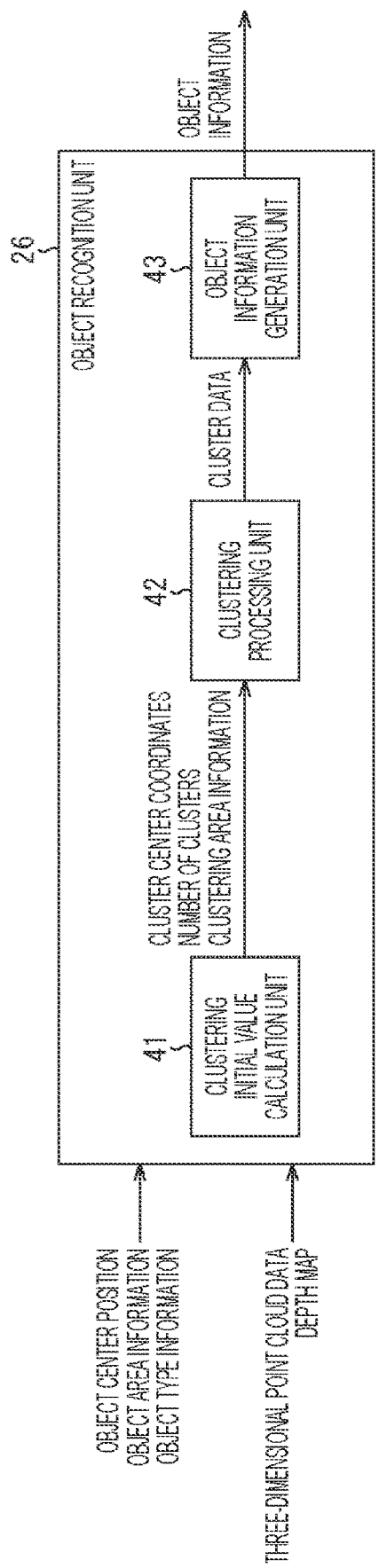
FIG. 15 is a block diagram illustrating a configuration example of an object recognition unit.

FIG. 15 is a block diagram illustrating a configuration example of the object recognition unit 26.

The object recognition unit 26 includes a clustering initial value calculation unit 41, a clustering processing unit 42, and an object information generation unit 43.

The clustering initial value calculation unit 41 is a block that calculates an initial value of a point cloud clustering process. The clustering initial value calculation unit 41 receives the object center position, the object area information, and the object type information supplied from the object detection unit 23, and also receives the depth map supplied from the distance measuring sensor signal processing unit 25. The clustering initial value calculation unit 41 calculates cluster center coordinates, the number of clusters, and clustering area information by using the received information. The clustering initial value calculation unit 41 outputs the calculated information to the clustering processing unit 42.

The cluster center coordinates are coordinates of the cluster center (the starting point of the clustering described above) at the start of the clustering process. The values of the cluster center coordinates are represented by three-dimensional coordinate values in the space scanned by the distance measuring sensor 24, and indicates any point in the three-dimensional point cloud data or the vicinity thereof. In addition, the number of cluster center coordinates is the same as the number of clusters.

The number of clusters is the number of clusters generated in the clustering process.

The clustering area information is information of a rectangular area including a point cloud, which is the target of the clustering process, and represents the size and position of the rectangular area. The position of the rectangular area is represented by a three-dimensional coordinate value in the space scanned by the distance measuring sensor 24. The number of rectangular areas is one or multiple.

The clustering processing unit 42 is a block that performs a point cloud clustering process. The clustering processing unit 42 uses a non-hierarchical clustering method such as the k-means method. The clustering processing unit 42 receives the cluster center coordinates, the number of clusters, and the clustering area information supplied from the clustering initial value calculation unit 41, and also receives the three-dimensional point cloud data supplied from the distance measuring sensor signal processing unit 25. The clustering processing unit 42 calculates cluster cloud data using the received information, and outputs the calculated cluster cloud data to the object information generation unit 43.

The cluster cloud data is a set of clusters, and the cluster is a set of three-dimensional coordinate values of a point cloud constituting the set of clusters. The number of clusters calculated is the same as the number of clusters.

The object information generation unit 43 is a block that determines the position, shape, and type of an object. The object information generation unit 43 receives the cluster cloud data supplied from the clustering processing unit 42 and also receives the object area information and the object type information from the object detection unit 23. The object information generation unit 43 generates object information by using the received information, and outputs the generated object information to the environment map creating unit 27.

The object information includes the position, shape, and type of an object. The position of the object is represented by a three-dimensional coordinate value in the space scanned by the distance measuring sensor 24. The shape is the size of a rectangular area including a point cloud constituting the object. The type corresponds to the object in the object type information.

Next, how each unit constituting the object recognition unit 26 operates when object recognition is performed on the basis of the center position of an object, the object area information, and the object type information, which are the detection results of the object, will be described. The description will be given with reference to FIGS. 16A, 16B, and 17 as appropriate.

Figure 16B:
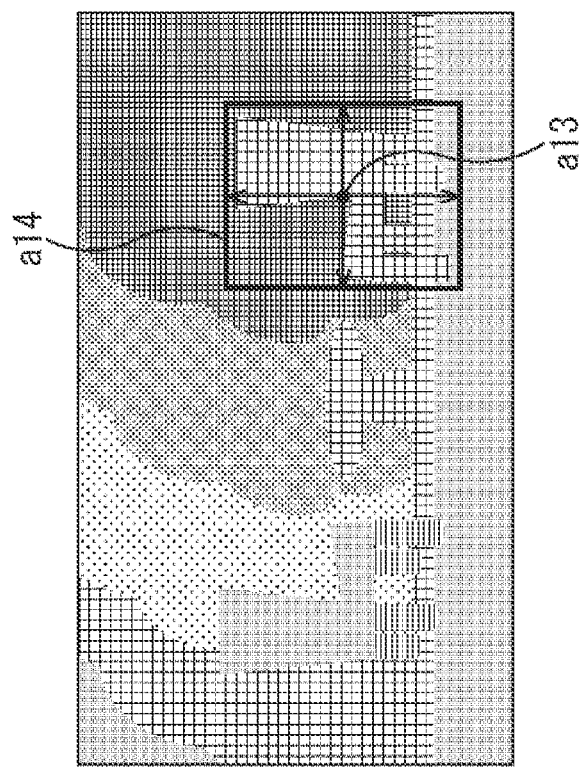
FIGS. 16A and 16B are diagrams illustrating an example of a two-dimensional image and a depth map.
Figure 16A:
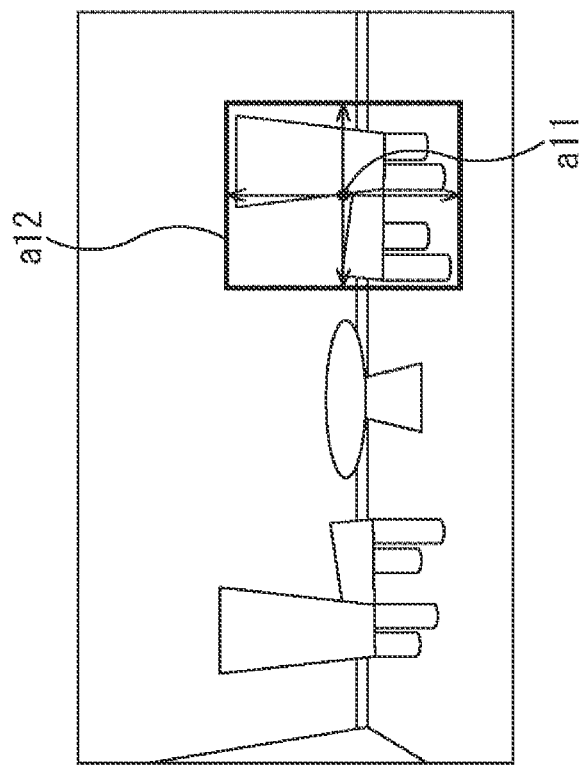

FIGS. 16A and 16B are diagrams illustrating an example of a two-dimensional image and a depth map.

FIG. 16A illustrates a two-dimensional image in which a small table is disposed between two chairs.

This two-dimensional image is an image that is captured by the image sensor 21 and is subjected to signal processing by the image sensor signal processing unit 22. A pixel position a11 and a bounding box a12 are shown in the two-dimensional image. The bounding box a12 is shown at a position surrounding the chair on the right side, and the pixel position a11 is the center of the bounding box a12.

FIG. 16B shows a depth map corresponding to the two-dimensional image in FIG. 16A. This depth map is a depth map scanned by the distance measuring sensor 24 and calculated by the distance measuring sensor signal processing unit 25.

<Calculation of Cluster Center Coordinates>

Next, a method of calculating cluster center coordinates, which is one of the initial values of clustering, will be described.

As described above, since the center of each object is set to the cluster center at the start of clustering, the clustering initial value calculation unit 41 obtains cluster center coordinates in the scan space of the distance measuring sensor 24 from the object center position in a two-dimensional image.

As described above, while the object center position is the pixel position a11 on the two-dimensional image in FIG. 16A, the scanning direction and the angle of view of the image sensor 21 and the distance measuring sensor 24 are the same, and thus the positional relationship between the pixels of the two-dimensional image and the depth map is the same. Accordingly, in the depth map of FIG. 16B, since a pixel at the same position as the object center position is the object center, a pixel position a13 of the object center in the depth map is obtained.

Furthermore, coordinates of the pixel in the scan space of the distance measuring sensor 24 are obtained from the angle of view of the distance measuring sensor 24, the pixel position in the depth map, and the depth value of the pixel.

The three-dimensional point cloud data is a set of points in the scan space of the distance measuring sensor 24, and the obtained coordinates are also coordinates in the scan space of the distance measuring sensor 24. The clustering initial value calculation unit 41 sets the obtained coordinates to the cluster center coordinates, which are the starting points of the point cloud clustering, as they are.

<Calculation of Number of Clusters>

Next, a method of calculating the number of clusters, which is one of the initial values of clustering, will be described.

Since it is desired to obtain point cloud data constituting the object detected by the object detection unit 23, the number of clusters is the number of objects detected by the object detection unit 23. The clustering initial value calculation unit 41 can thus set the center position of the object to the cluster center coordinates, which are the starting point of the point cloud clustering, as it is.

<Calculation of Clustering Area Information>

Next, a method of calculating clustering area information, which is one of the initial values of clustering, will be described.

The clustering initial value calculation unit 41 obtains a three-dimensional area including a point cloud to be clustered on the basis of object area information in a two-dimensional image.

Since the scanning direction and the angle of view of the image sensor 21 and the distance measuring sensor 24 are the same, the bounding box a12 arranged on the two-dimensional image in FIG. 16A is represented as a bounding box a14 arranged at the same position in the depth map in FIG. 16B. The size in the depth direction of the bounding box a14 is obtained on the basis of the maximum and minimum depth values of each pixel within the area of the bounding box a14 in the depth map.

As a result, the position of the rectangular parallelepiped area in the scan space of the distance measuring sensor 24 is obtained from the angle of view of the distance measuring sensor 24, the pixel position of the bounding box a14 in the depth map, and the size thereof in the depth direction.

As described above, the position information of the rectangular parallelepiped area (for example, a combination of information in which the position and the size of the area are uniquely determined, such as coordinates of an end point of the front quadrangle and the size in the depth direction of the rectangular parallelepiped) can be set to the clustering area information.

<Clustering Process>

The clustering processing unit 42 performs a clustering process using a non-hierarchical clustering method such as the k-means method on the basis of the initial values of clustering obtained by the clustering initial value calculation unit 41.

The cluster center coordinates and the number of clusters may be used as they are as the initial values of clustering.

Regarding the cluster area information, it is possible to determine whether or not a point to be clustered is a clustering target by checking whether or not the point is within the area represented by the clustering area information.

In the k-means method, the process of searching for the nearest cluster center is performed for each point, but this process can be eliminated if the point is out of a clustering target. As a result, the amount of processing is greatly reduced as compared with a case where the clustering process is performed on all the point clouds of the three-dimensional point cloud data.

Here, since the clustering area information is also represented as a rectangular parallelepiped area, a point cloud that does not belong to the object detected by the object detection unit 23 may be included. In such a case, if the geometric distance such as the Euclidean distance is used as a distance for searching for the nearest cluster center, a cluster including an unnecessary point cloud is formed.

However, by using the distance in view of the correlation between point clouds such as the Mahalanobis distance, it is possible to exclude a point with a certain distance or more, and thus it is possible to exclude a point cloud unnecessary for the object.

<Generation of Object Information>

The object information generation unit 43 estimates the position and shape of an object on the basis of the point cloud constituting the object obtained by the clustering processing unit 42.

In order to recognize each cluster cloud data obtained by the clustering processing unit 42 as an object, it is necessary to associate the object detected by the object detection unit 23 with a cluster. The association between the detected object and the cluster is performed by examining the positional relationship between the bounding box indicated by the object area information and the area in the three-dimensional space of the cluster.

FIG. 17 is a diagram illustrating an example of projection of a cluster area onto an XY plane and a positional relationship between a depth map and a two-dimensional image.

FIG. 17 illustrates a bounding box as an area obtained by projecting an area surrounding a cluster onto an XY plane that is the same plane as the depth map and the two-dimensional image.

Specifically, since the object area information is the bounding box on the two-dimensional image, the positional relationship can be examined by projecting the area in the three-dimensional space of the cluster onto the same plane as the two-dimensional image and the depth map.

In the cluster of cluster cloud data, a point a20 located at the left end and a point a21 located at the right end in the horizontal axis (the x axis) direction, a point a22 located at the upper end and a point a23 located at the lower end in the vertical axis (the y axis) direction are obtained, and thus a quadrangular area a31 surrounding the cluster is obtained from the coordinates. The quadrangular area a31 is projected onto the XY plane to obtain a bounding box a41 of the cluster on the XY plane.

The three-dimensional space of the three-dimensional point cloud data is equal to the scan space of the distance measuring sensor 24. Accordingly, the area defined by the x-axis and the y-axis of the three-dimensional space is the same as that of the depth map, and it is also the same as that of the two-dimensional image.

As a result, the bounding box on the two-dimensional image having the largest area overlapping the bounding box a41 on the XY plane of the cluster is the bounding box corresponding to the cluster, and is the object corresponding to the cluster.

Since the object area information and the object type information are associated with each other for each object, as described above, when the object area information corresponding to the cluster is obtained, the object type information corresponding to the cluster is uniquely determined.

The shape of the object may be a rectangular parallelepiped surrounding the cluster, may be another simple three-dimensional shape such as an ellipsoid instead of a rectangular parallelepiped, or may be a complicated three-dimensional shape of a polygon.

Note that the points can be replaced with small cubes and represented as voxels.

The position of the solid representing the cluster, the shape of the solid representing the cluster, and the type of the object corresponding to the cluster obtained as described above are the object information.

<Operation of Autonomous Mobile Robot System>

Figure 18:
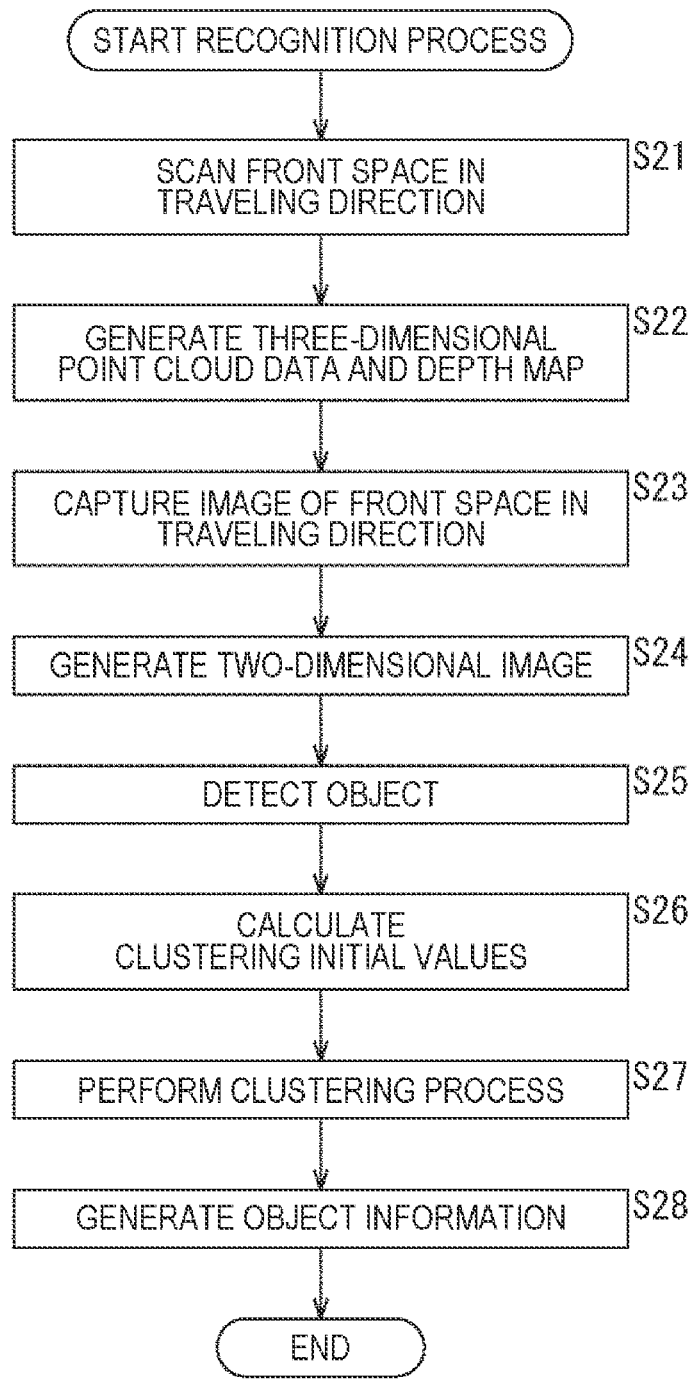
FIG. 18 is a flowchart of a recognition process of the autonomous mobile robot system illustrated in FIG. 14.

FIG. 18 is a flowchart of a recognition process of the autonomous mobile robot system 11 illustrated in FIG. 14.

In step S21, the distance measuring sensor 24 scans the front space in a traveling direction. The distance measuring sensor 24 outputs RAW data of the scan result to the distance measuring sensor signal processing unit 25.

In step S22, the distance measuring sensor signal processing unit 25 performs various types of filtering processes necessary for generating point cloud data and a depth map on the RAW data supplied from the distance measuring sensor 24 to generate three-dimensional point cloud data and the depth map. The distance measuring sensor signal processing unit 25 outputs the generated three-dimensional point cloud data and the generated depth map to the object recognition unit 26.

In step S23, the image sensor 21 captures the front space in the traveling direction and generates an image. The image sensor 21 outputs RAW data of the image to the image sensor signal processing unit 22.

In step S24, the image sensor signal processing unit 22 performs various types of signal processing such as lens correction and noise removal on the RAW data supplied from the image sensor 21 to generate a two-dimensional image. The image sensor signal processing unit 22 outputs the generated two-dimensional image to the object detection unit 23.

In step S25, the object detection unit 23 detects an object in the surrounding space on the basis of the two-dimensional image supplied from the image sensor signal processing unit 22. That is, the object detection unit 23 estimates an object center position, an object area, and an object type for each object using an object detection method based on machine learning on the basis of the two-dimensional image. The object detection unit 23 outputs the object center position, the object area information, and the object type information to the object recognition unit 26.

The clustering initial value calculation unit 41 receives the object center position, the object area information, and the object type information supplied from the object detection unit 23, and also receives the depth map supplied from the distance measuring sensor signal processing unit 25.

In step S26, the clustering initial value calculation unit 41 calculates cluster center coordinates, the number of clusters, and clustering area information as clustering initial values by using the received information. The clustering initial value calculation unit 41 outputs the calculated information to the clustering processing unit 42.

The clustering processing unit 42 receives the cluster center coordinates, the number of clusters, and the clustering area information supplied from the clustering initial value calculation unit 41, and also receives the three-dimensional point cloud data supplied from the distance measuring sensor signal processing unit 25.

In step S27, the clustering processing unit 42 performs a clustering process by using the received information. That is, the clustering processing unit 42 calculates cluster cloud data and outputs the calculated cluster cloud data to the object information generation unit 43.

The object information generation unit 43 receives the cluster cloud data supplied from the clustering processing unit 42 and also receives the object area information and the object type information from the object detection unit 23.

In step S28, the object information generation unit 43 generates object information by using the received information. The generated object information is output to the environment map creating unit 27.

After step S28, the recognition process of the autonomous mobile robot system 11 ends.

As described above, in the first embodiment, by estimating the center position and the area of the object by the object detection based on machine learning, the point cloud to be clustered is limited to the area where there is a high possibility that the object is present. Furthermore, the point at which the center of the object is highly likely to be present is set to the cluster center at the start of clustering.

Therefore, clustering can be performed with the number of clusters that can cover objects with high accuracy, and the time required for the clustering process can be minimized.

2. Second Embodiment (Prioritization of Object Detection)

As described above, in the first embodiment, in order to improve the efficiency of the point cloud clustering, the object is detected by machine learning, and the initial value of the clustering is determined using the result.

In object detection based on machine learning, in general, as the number of types of objects to be detected increases, the amount of calculation and the processing time increase. For example, in the case of object detection by CNN, the number of hidden layers (intermediate layers) and the number of input/output channels of the hidden layers increase. Furthermore, in the case of object detection using a histogram of neural network (HOG) feature amount and a support vector machine (SVM), the number of SVMs increases.

In a case where the autonomous mobile robot is operated in a complex environment in which a wider variety of objects are mixed, object detection needs to be able to detect a wider variety of objects. In this case, more time is required for the object detection, and as a result, the time required for object recognition also increases, so that it is difficult to maintain the real-time property of the object recognition.

As described above in "Improvement in efficiency of point cloud clustering", it is not always necessary to recognize all objects, and it is only required to perform a combination of "Real-time recognition of specific type of objects" and "Intermittent recognition of various types of objects". In this case, if object detection supporting various types of objects is used even in real-time recognition of a specific type of object, the efficiency of object detection is very poor. Therefore, in a second embodiment, the priority is assigned in object detection.

For example, in the above description, the priority is assigned according to the object type information, like a person is prioritized. Furthermore, the priority is assigned according to the object position information, like an object at a long distance from the autonomous mobile robot is excluded. Since the object detection is performed on the basis of the priority, it can be said that the object recognition performed using the object result is also substantially performed on the basis of the priority.

<Configuration Example of Autonomous Mobile Robot System>

Figure 19:
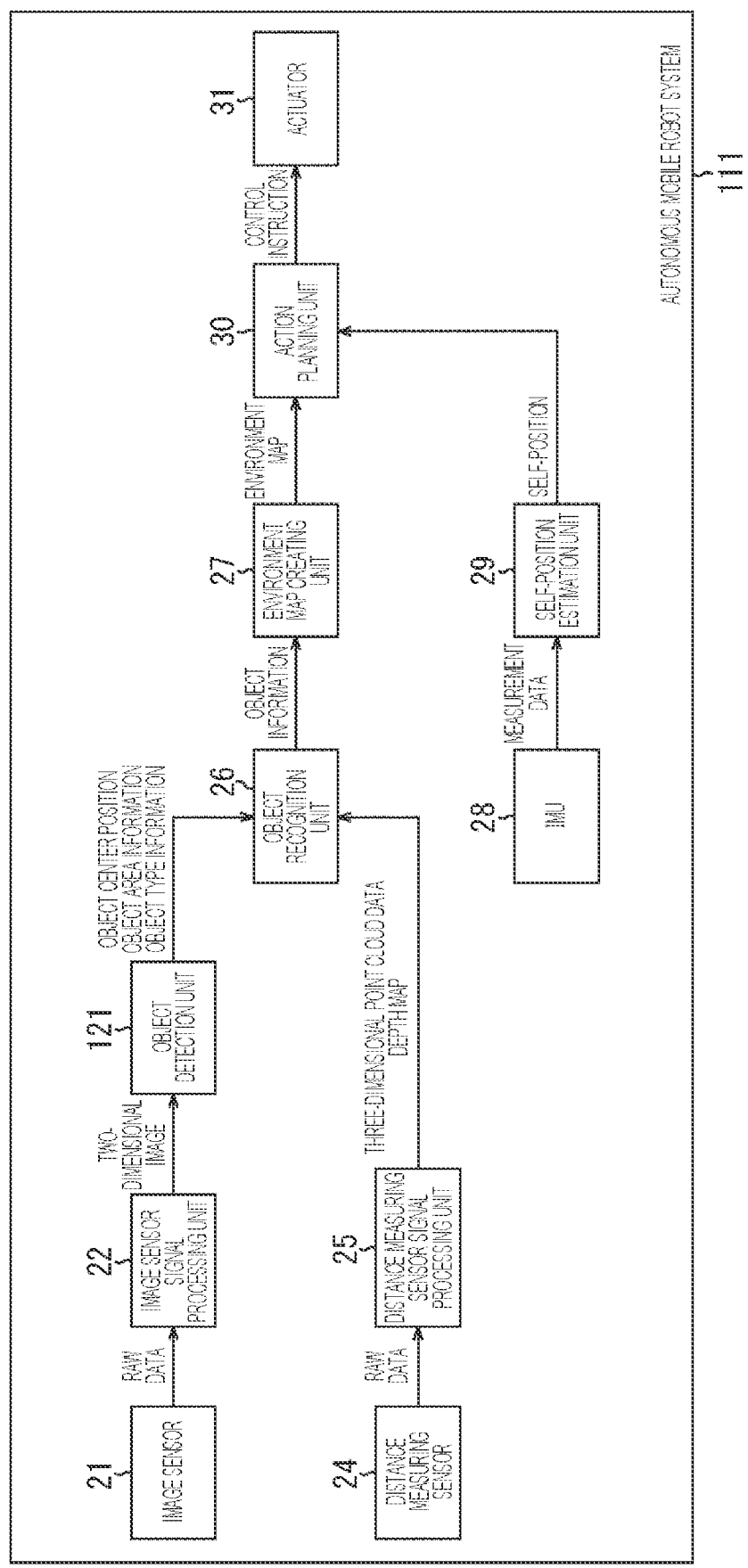
FIG. 19 is a diagram illustrating a configuration example of an autonomous mobile robot system according to a second embodiment of the present technology.

FIG. 19 is a diagram illustrating a configuration example of an autonomous mobile robot system according to a second embodiment of the present technology.

In the configuration of FIG. 19, portions corresponding to those of FIG. 14 are denoted by the same reference numerals. Overlapping description will be omitted as appropriate.

An autonomous mobile robot system 111 illustrated in FIG. 19 is different from the autonomous mobile robot system 11 illustrated in FIG. 14 in that the object detection unit 23 is replaced with an object detection unit 121.

The object detection unit 121 detects a priority object and a non-priority object, and outputs at least one of a detection result of the priority object or a detection result of the non-priority object to the object recognition unit 26.

<Configuration Example of Object Detection Unit>

Figure 20:
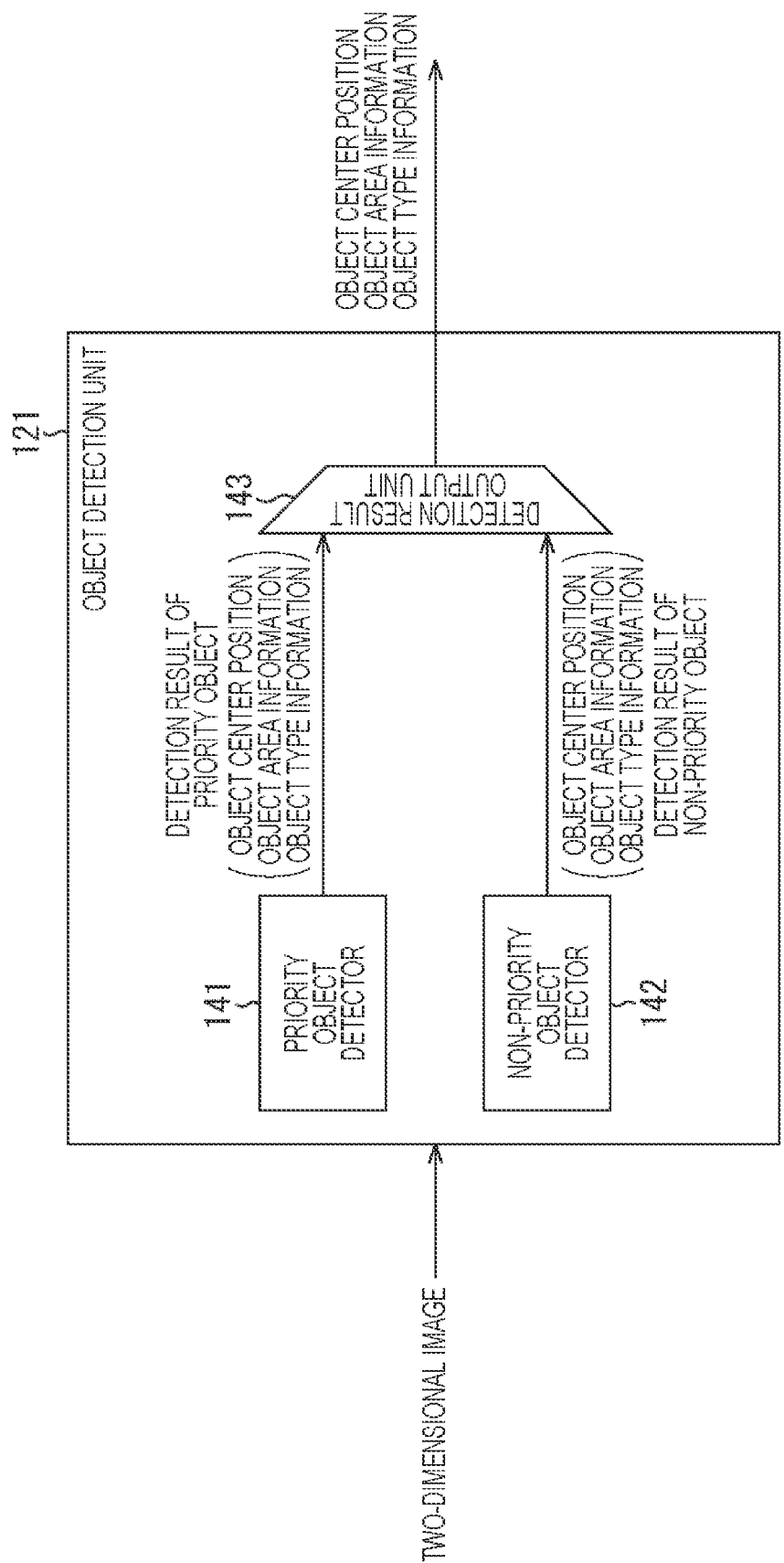
FIG. 20 is a block diagram illustrating a configuration example of an object detection unit.

FIG. 20 is a block diagram illustrating a configuration example of the object detection unit 121.

The object detection unit 121 illustrated in FIG. 20 includes a priority object detector 141, a non-priority object detector 142, and a detection result output unit 143.

The priority object detector 141 detects an object in a surrounding space on the basis of a two-dimensional image. The priority object detector 141 reduces the time required for object detection as much as possible instead of reducing the number of types of detectable objects. Furthermore, the types of detectable objects do not overlap those of the non-priority object detector 142.

The priority object detector 141 receives the two-dimensional image supplied from the image sensor signal processing unit 22, and estimates an object center position, an object area, and an object type for each priority object using an object detection method based on machine learning, similarly to the object detection unit 23. The priority object detector 141 outputs the object center position, the object area information, and the object type information, which are the detection results of priority objects, to the detection result output unit 143.

The non-priority object detector 142 detects an object in a surrounding space on the basis of a two-dimensional image. The number of types of detectable objects of the non-priority object detector 142 is larger than that of the priority object detector 141, and the time required for the non-priority object detector 142 to perform object detection is longer than that of the priority object detector 141.

The non-priority object detector 142 receives the two-dimensional image supplied from the image sensor signal processing unit 22, and estimates an object center position, an object area, and an object type for each non-priority object other than the priority object using the object detection method based on machine learning, similarly to the object detection unit 23. The non-priority object detector 142 outputs the object center position, the object area information, and the object type information, which are the detection results of non-priority objects, to the detection result output unit 143.

As the object detection unit 121, the detection result output unit 143 outputs an object detection result. The detection result output unit 143 outputs either the detection result of the priority object or the detection result of the non-priority object, or a combination of both the detection results to the object recognition unit 26 as the object detection result.

How each unit constituting the object detection unit 121 operates to implement "Real-time recognition of specific type of objects" and "Intermittent recognition of various types of objects" will be described below.

<Real-Time Recognition of Specific Type of Objects>

In real-time recognition of the specific type of objects, only the object detected by the priority object detector 141 is recognized. Accordingly, the detection result output unit 143 outputs the object center position, the object area information, and the object type information, which are the detection results of the priority object, to the object recognition unit 26.

<Intermittent Recognition of Various Types of Objects>

In intermittent recognition of various types of objects, the object detected by the priority object detector 141 and the object detected by the non-priority object detector 142 are recognized. Accordingly, the detection result output unit 143 combines the detection result of the priority object and the detection result of the non-priority object, and outputs the object center position, the object area information, and the object type information, which are the combined object detection results, to the object recognition unit 26.

<Operation of Autonomous Mobile Robot System>

The recognition process of the autonomous mobile robot system 111 is similar to the recognition process of the autonomous mobile robot system 11 illustrated in FIG. 18 except for the object detection process in step S25. Accordingly, in the operation of the autonomous mobile robot system 111, only the object detection process, which is different from that of the autonomous mobile robot system 11 illustrated in FIG. 18, will be described.

Figure 21:
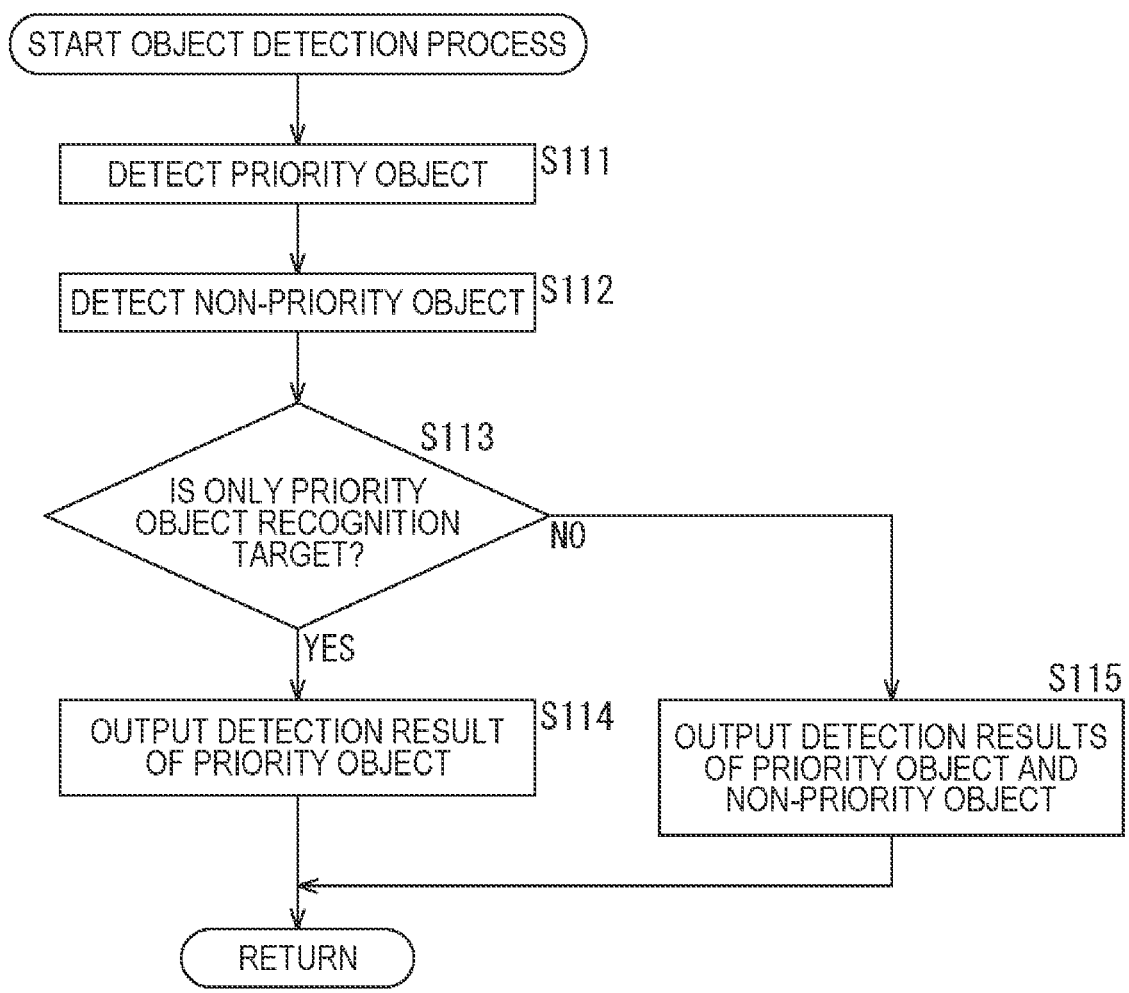
FIG. 21 is a flowchart of an object detection process of the autonomous mobile robot system illustrated in FIG. 19.

FIG. 21 is a flowchart of an object detection process of the autonomous mobile robot system 111.

In step S111, the priority object detector 141 detects a priority object. That is, the priority object detector 141 receives the two-dimensional image supplied from the image sensor signal processing unit 22, and estimates an object center position, an object area, and an object type for each priority object using an object detection method based on machine learning. The priority object detector 141 outputs the object center position, the object area information, and the object type information, which are the detection results of the priority object, to the detection result output unit 143.

In step S112, the non-priority object detector 142 detects a non-priority object. That is, the non-priority object detector 142 receives the two-dimensional image supplied from the image sensor signal processing unit 22, and estimates an object center position, an object area, and an object type for each non-priority object using the object detection method based on machine learning. The non-priority object detector 142 outputs the object center position, the object area information, and the object type information, which are the detection results of the non-priority object, to the detection result output unit 143.

As described above, in the autonomous mobile robot system 111, "Real-time recognition of specific type of objects" and "Intermittent recognition of various types of objects" are performed. That is, the recognition of specific types of objects (step S114) is performed in real time, whereas the recognition of various types of objects (step S115) is intermittently performed.

In step S113, the detection result output unit 143 determines whether or not only the priority object is a recognition target. If it is determined in step S113 that only the detection result of the priority object is supplied to the detection result output unit 143 and only the priority object is the recognition target, the process proceeds to step S114.

In step S114, the detection result output unit 143 outputs the object center position, the object area information, and the object type information, which are the detection results of the priority object by the priority object detector 141, to the object recognition unit 26. At this time, the object recognition unit 26 performs a clustering process using the object center position, the object area information, and the object type information, which are the detection results of the priority object. After step S114, the object detection process ends.

On the other hand, if it is determined in step S113 that the detection result of the non-priority object is also supplied and only the priority object is not the recognition target, the process proceeds to step S115.

In step S115, the detection result output unit 143 combines the object detection results of the priority object detector 141 and the non-priority object detector 142, and outputs the object center position, the object area information, and the object type information, which are the combined object detection results, to the object recognition unit 26. After step S115, the object detection process ends.

As described above, in the second embodiment, the object detection based on machine learning is separated into the object detector in which the processing scale is minimized while the detection target is limited to the type of objects desired to be recognized in real time, and the object detector capable of detecting various objects corresponding to the other types of objects.

As a result, even in a case where the number of types of objects to be recognized is increased, it is possible to avoid an increase in time required for recognizing an object to be recognized in real time.

3. Third Embodiment (Accuracy Classification of Object Detection)

According to the second embodiment, as described ab, in object detection based on machine learning, in general, as the number of types of objects to be detected increases, the amount of calculation and the processing time increase. However, the amount of calculation and the processing time in the object detection based on machine learning increase or decrease not only according to the number of types of detectable objects, but also according to the detection accuracy.

For example, in the case of CNN, in general, the estimation accuracy of the type of objects improves as the number of hidden layers increases. The accuracy of object detection in an autonomous mobile robot also changes depending on the characteristics of the space in which the autonomous mobile robot moves. For example, the accuracy of object detection required to detect a person is different between a space with a simple background in which a person stands with a white wall surface as a background and a space with a complicated background in which a person stands with various objects such as a desk, a chair, and a shelf as a background.

In order to cause the autonomous mobile robot to handle various spaces with different difficulty levels of recognition, it is necessary to detect an object with high estimation accuracy. Increasing the estimation accuracy leads to an increase in time required for object detection, and further leads to an increase in time required for object recognition, so that it is difficult to maintain the real-time property of object recognition.

Therefore, in a third embodiment, the object detection includes two types of detectors. One is an object detector with low estimation accuracy whose estimation accuracy is low but processing time is short. The other is an object detector with high estimation accuracy whose estimation accuracy is high but processing time is long.

Normally, the clustering process based on the detection result of the object detector with low estimation accuracy is performed, and in a case where the detection omission of an object occurs in the object detector with low estimation accuracy, the clustering process based on the detection result of the object detector with high estimation accuracy is performed. As a result, the real-time property of the object recognition can be secured as much as possible.

<Configuration Example of Autonomous Mobile Robot System>

Figure 22:
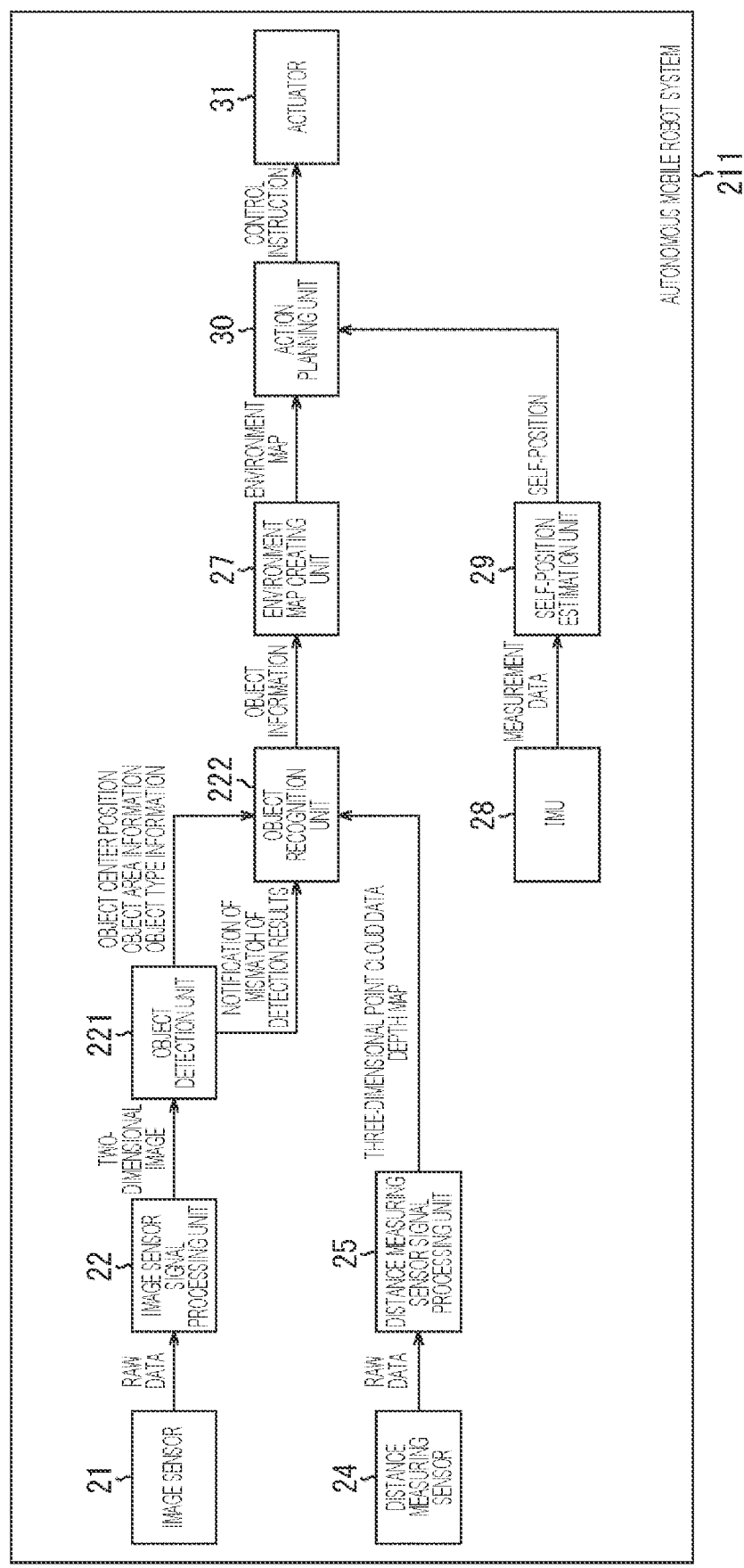
FIG. 22 is a diagram illustrating a configuration example of an autonomous mobile robot system according to a third embodiment of the present technology.

FIG. 22 is a diagram illustrating a configuration example of an autonomous mobile robot system according to a third embodiment of the present technology.

In the configuration of FIG. 22, portions corresponding to those of FIG. 14 are denoted by the same reference numerals. Overlapping description will be omitted as appropriate.

An autonomous mobile robot system 211 illustrated in FIG. 22 is different from the autonomous mobile robot system 11 illustrated in FIG. 14 in that the object detection unit 23 is replaced with an object detection unit 221 and the object recognition unit 26 is replaced with an object recognition unit 222.

The object detection unit 221 performs object detection with low estimation accuracy and object detection with high estimation accuracy in parallel.

The object detection unit 221 outputs, to the object recognition unit 222, an object detection result with low estimation accuracy in which the processing time is short and the object detection is completed first.

In a case where the object detection with high estimation accuracy is completed, the object detection unit 221 compares the object detection result with high estimation accuracy with the object detection result with low estimation accuracy. Only in a case where the object detection result with high estimation accuracy and the object detection result with low estimation accuracy do not match, the object detection unit 221 outputs the object detection result with high estimation accuracy and a notification of mismatch of the detection results to the object recognition unit 222.

The object recognition unit 222 is configured similarly to the object recognition unit 26 illustrated in FIG. 14. That is, the object recognition unit 222 includes the clustering initial value calculation unit 41, the clustering processing unit 42, and the object information generation unit 43 illustrated in FIG. 15.

The object recognition unit 222 normally performs a clustering process by using the object detection result with low estimation accuracy supplied from the object detection unit 221.

In a case where the object detection result with high estimation accuracy and the notification of mismatch of the detection results are supplied from the object detection unit 221, the object recognition unit 222 stops the clustering process using the object detection result with low estimation accuracy and performs the clustering process again using the object detection result with high estimation accuracy.

<Configuration Example of Object Detection Unit>

Figure 23:
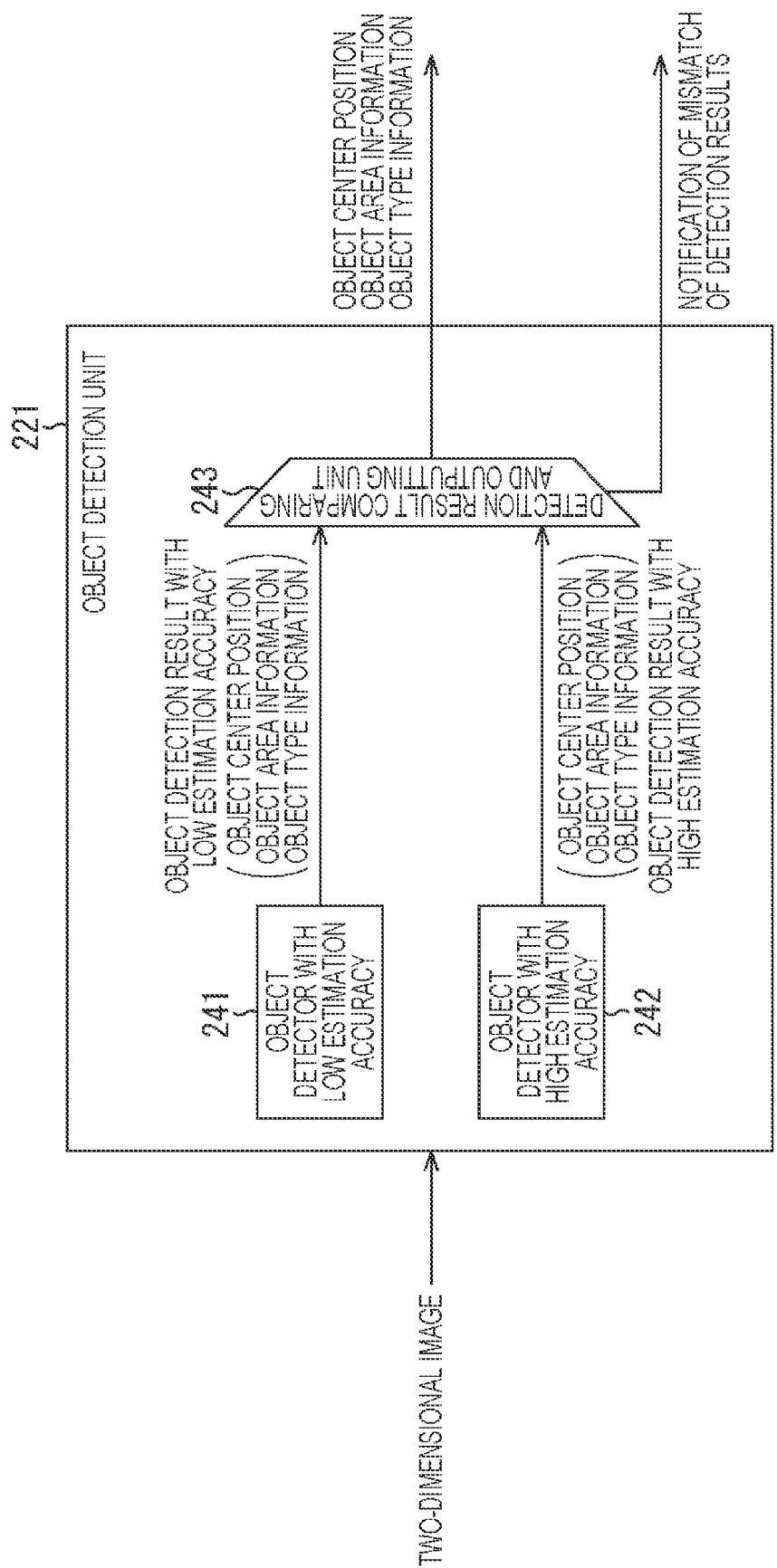
FIG. 23 is a block diagram illustrating a configuration example of an object detection unit.

FIG. 23 is a block diagram illustrating a configuration example of the object detection unit 221.

The object detection unit 221 illustrated in FIG. 23 includes an object detector 241 with low estimation accuracy, an object detector 242 with high estimation accuracy, and a detection result comparing and outputting unit 243.

The object detector 241 with low estimation accuracy detects an object in a surrounding space on the basis of a two-dimensional image. The object detector 241 with low estimation accuracy reduces the estimation accuracy of the object to reduce the time required for object detection as much as possible. Note that the type of an object detectable by the object detector 241 with low estimation accuracy is the same as that of the object detector 242 with high estimation accuracy.

The object detector 241 with low estimation accuracy receives the two-dimensional image supplied from the image sensor signal processing unit 22, and estimates an object center position, an object area, and an object type for each object using an object detection method based on machine learning, similarly to the object detection unit 23. The object detector 241 with low estimation accuracy outputs the object center position, the object area information, and the object type information, which are the object detection results with low estimation accuracy, to the detection result comparing and outputting unit 243.

The object detector 242 with high estimation accuracy detects an object in a surrounding space on the basis of a two-dimensional image. The object detector 242 with high estimation accuracy has object estimation accuracy higher than that of the object detector 241 with low estimation accuracy, but the time required for object detection is longer than that of the object detector 241 with low estimation accuracy. Note that the type of an object detectable by the object detector 242 with high estimation accuracy is the same as that of the object detector 241 with low estimation accuracy.

The object detector 242 with high estimation accuracy receives the two-dimensional image supplied from the image sensor signal processing unit 22, and estimates an object center position, an object area, and an object type for each object using the object detection method based on machine learning, similarly to the object detection unit 23. The object detector 242 with high estimation accuracy outputs the object center position, the object area information, and the object type information, which are the object detection results with high estimation accuracy, to the detection result comparing and outputting unit 243.

As the object detection unit 221, the detection result comparing and outputting unit 243 outputs the object detection result to the object recognition unit 222. When receiving the object detection result with low estimation accuracy supplied from the object detector 241 with low estimation accuracy, the detection result comparing and outputting unit 243 outputs the object detection result with low estimation accuracy to the object recognition unit 222.

When receiving the object detection result with high estimation accuracy supplied from the object detector 242 with high estimation accuracy, the detection result comparing and outputting unit 243 compares the object detection result with low estimation accuracy received before with the object detection result with high estimation accuracy.

In a case where the object detection result with low estimation accuracy and the object detection result with high estimation accuracy do not match, the detection result comparing and outputting unit 243 outputs the object detection result with high estimation accuracy and a notification of mismatch of the detection results to the object recognition unit 222.

Next, how each unit constituting the object detection unit 221 and the object recognition unit 222 operate will be described.

<Performance of Clustering Process Based on Object Detection Result with Low Estimation Accuracy>

First, when a two-dimensional image is input from the image sensor signal processing unit 22, the object detector 241 with low estimation accuracy and the object detector 242 with high estimation accuracy each start an object detection process. Note that, for example, in a case where object detection with low estimation accuracy is performed for each frame, object detection with high estimation accuracy may be performed once in several frames.

Since the time required for an object detection process is shorter in the object detector 241 with low estimation accuracy, first, the object detection result with low estimation accuracy (an object center position, object area information, object type information) of the object detector 241 with low estimation accuracy is output to the detection result comparing and outputting unit 243.

The detection result comparing and outputting unit 243 outputs the object detection result with low estimation accuracy (the object center position, the object area information, and the object type information) supplied from the object detector 241 with low estimation accuracy to the object recognition unit 244.

The object recognition unit 244 performs a clustering process by using the object detection result with low estimation accuracy (the object center position, the object area information, and the object type information) supplied from the detection result comparing and outputting unit 243.

<Comparison of Object Detection Results>

The object detection result with high estimation accuracy (an object center position, object area information, object type information) of the object detector 242 with high estimation accuracy is output to the detection result comparing and outputting unit 243 later than the output of the object detection result of the object detector 241 with low estimation accuracy.

The detection result comparing and outputting unit 243 compares the object detection result with high estimation accuracy supplied from the object detector 242 with high estimation accuracy with the object detection result with low estimation accuracy previously supplied from the object detector 241 with low estimation accuracy.

The detection result comparing and outputting unit 243 determines that the object detection results match in a case where the numbers of objects detected, the types of objects detected, and the object center positions each match, and determines that the object detection results do not match in other cases.

<Reperformance of Clustering Process Based on Object Detection Result with High Estimation Accuracy>

When determining that the object detection results do not match, the detection result comparing and outputting unit 243 notifies the object recognition unit 222 that the detection results do not match by a notification of mismatch of the detection results. At the same time, the detection result comparing and outputting unit 243 outputs the object detection result with high estimation accuracy (the object center position, the object area information, and the object type information) to the object recognition unit 222.

The object recognition unit 222 stops the clustering process using the object detection result with low estimation accuracy on the basis of the notification of mismatch of the detection results, and starts the clustering process using the object detection result with high estimation accuracy newly supplied from the detection result comparing and outputting unit 243.

Note that, in a case where the object recognition using the object detection result with low estimation accuracy is completed when the notification of mismatch of the detection results is supplied, the object recognition unit 222 starts the clustering process using the object detection result with high estimation accuracy and generates object information again. In a case where the object information is generated again, it is necessary to generate again an environment map and a control instruction affected by the information. In this case, the operation of a robot may be temporarily stopped, and the operation may be started again after the environment map and the control instruction are generated.

<Operation of Autonomous Mobile Robot System>

Figure 24:
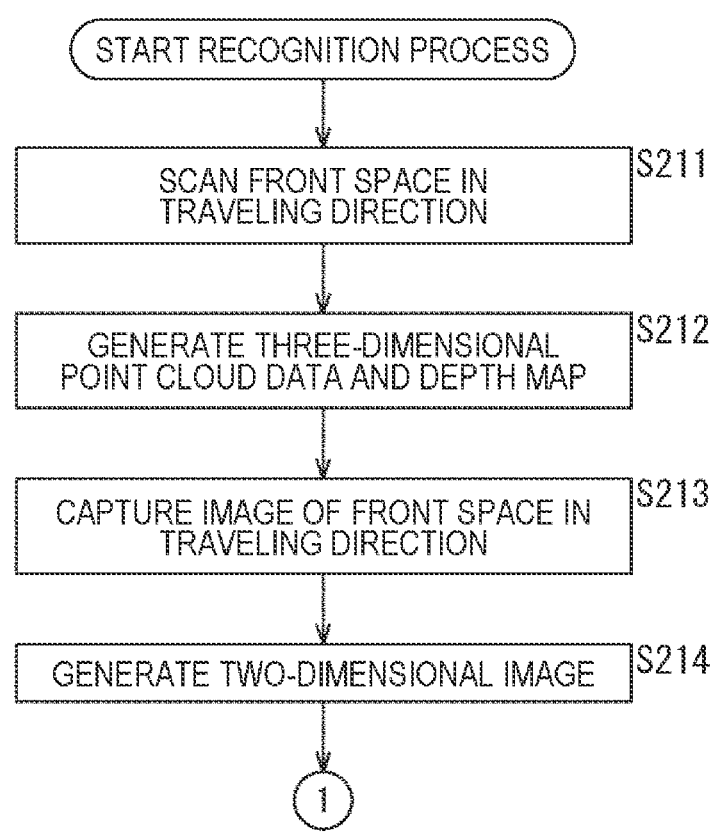
FIG. 24 is a flowchart of a recognition process of the autonomous mobile robot system illustrated in FIG. 22.
Figure 25:
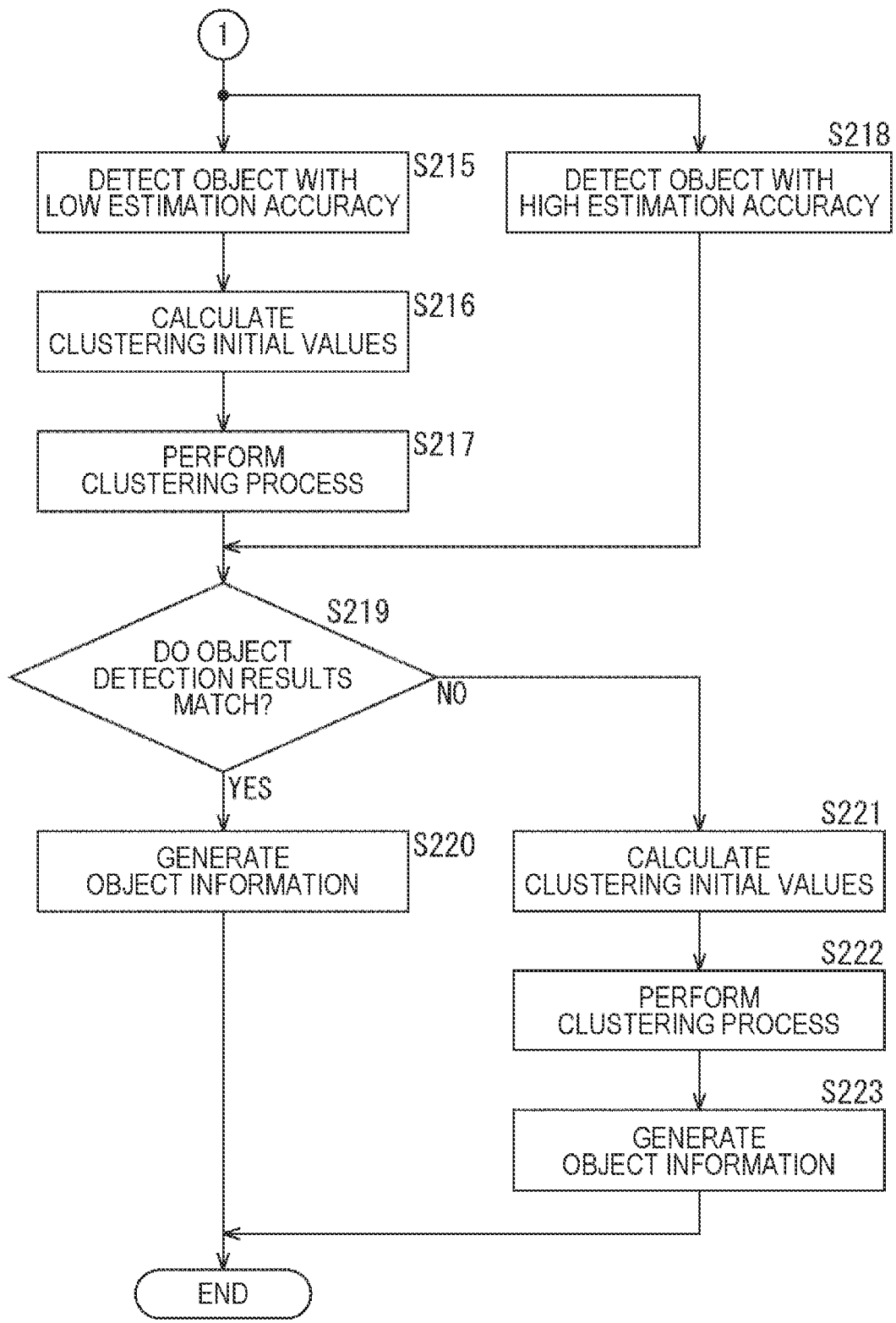
FIG. 25 is a flowchart of the recognition process, following FIG. 24.

FIGS. 24 and 25 are flowcharts of a recognition process of the autonomous mobile robot system 211.

Note that the processes in steps S211 to S214 in FIG. 24 are basically similar to the processes in steps S21 to S24 in FIG. 18, and thus the description thereof will be omitted.

In step S215 of FIG. 25, the object detector 241 with low estimation accuracy receives the two-dimensional image supplied from the image sensor signal processing unit 22 and detects an object with low estimation accuracy. The object detection result with low estimation accuracy is supplied to the detection result comparing and outputting unit 243.

The object detection with low estimation accuracy in step S215 is completed earlier because the processing time is shorter than that of object detection with high estimation accuracy in step S218 to be described later. Accordingly, since the object detection result with high estimation accuracy has not been supplied, the detection result comparing and outputting unit 243 outputs an object center position, object area information, and object type information, which are the object detection results with low estimation accuracy, to the clustering initial value calculation unit 41.

The clustering initial value calculation unit 41 receives the object center position, the object area information, and the object type information supplied from the object detection unit 221, and also receives the depth map supplied from the distance measuring sensor signal processing unit 25.

In step S216, the clustering initial value calculation unit 41 calculates cluster center coordinates, the number of clusters, and clustering area information as clustering initial values by using the received information. The clustering initial value calculation unit 41 outputs the calculated information to the clustering processing unit 42.

The clustering processing unit 42 receives the cluster center coordinates, the number of clusters, and the clustering area information supplied from the clustering initial value calculation unit 41, and also receives the three-dimensional point cloud data supplied from the distance measuring sensor signal processing unit 25.

In step S217, the clustering processing unit 42 performs a clustering process by using the received information. That is, the clustering processing unit 42 calculates cluster cloud data and outputs the calculated cluster cloud data to the object information generation unit 43.

On the other hand, in step S218, the object detector 242 with high estimation accuracy receives the two-dimensional image supplied from the image sensor signal processing unit 22 and detects an object with high estimation accuracy in parallel with the process in step S215. The object detection result with high estimation accuracy is supplied to the detection result comparing and outputting unit 243.

In step S219, the detection result comparing and outputting unit 243 determines whether or not the object detection result with high estimation accuracy and the object detection result with low estimation accuracy match. If it is determined in step S219 that the object detection result with high estimation accuracy and the object detection result with low estimation accuracy match, the process proceeds to step S220.

In step S220, the object information generation unit 43 generates object information by using the cluster cloud data supplied in step S217 and the object area information and the object type information supplied in step S215. The generated object information is output to the environment map creating unit 27.

On the other hand, if it is determined in step S219 that the object detection result with high estimation accuracy and the object detection result with low estimation accuracy do not match, the process proceeds to step S221.

At this time, the detection result comparing and outputting unit 243 outputs the object center position, the object area information, and the object type information, which are the object detection results with high estimation accuracy, and a notification of mismatch of the detection results to the clustering initial value calculation unit 41.

The clustering initial value calculation unit 41 or the clustering processing unit 42 stops the process being performed using the object detection result with low estimation accuracy on the basis of the notification of mismatch of the detection results.

The clustering initial value calculation unit 41 receives the object center position, the object area information, and the object type information, which are the object detection results with high estimation accuracy supplied from the object detection unit 221, and also receives the depth map supplied from the distance measuring sensor signal processing unit 25.

In step S221, the clustering initial value calculation unit 41 calculates cluster center coordinates, the number of clusters, and clustering area information as clustering initial values by using the received information. The clustering initial value calculation unit 41 outputs the calculated information to the clustering processing unit 42.

The clustering processing unit 42 receives the cluster center coordinates, the number of clusters, and the clustering area information supplied from the clustering initial value calculation unit 41, and also receives the three-dimensional point cloud data supplied from the distance measuring sensor signal processing unit 25.

In step S222, the clustering processing unit 42 performs the clustering process by using the received information. That is, the clustering processing unit 42 calculates cluster cloud data and outputs the calculated cluster cloud data to the object information generation unit 43.

In step S223, the object information generation unit 43 generates object information by using the cluster cloud data supplied in step S222 and the object area information and the object type information supplied in step S218. The generated object information is output to the environment map creating unit 27.

After step S220 or S223, the recognition process of the autonomous mobile robot system 211 ends.

As described above, in the third embodiment, the object detection based on machine learning is implemented by the object detectors with different detection processing times depending on the level of the object estimation accuracy, and while the object recognition with low estimation accuracy but a short detection time is performed, the object recognition can be performed again later using the detection result of the object detector with high estimation accuracy as necessary. As a result, it is possible to avoid an increase in time required for recognizing an object as much as possible while various spaces are handled.

Note that the non-hierarchical clustering method such as the k-means method is used as the point cloud clustering method in object recognition in the first to third embodiments, but a hierarchical clustering method such as a shortest distance method may be used.

In the hierarchical clustering method, the cluster center point as an initial value of clustering is unnecessary. However, since narrowing down a point cloud to be clustered using the object detection result is effective, and the number of clusters determined using the object detection result can also be used as the condition for ending clustering, it is effective for improving the efficiency of the clustering process.

Furthermore, the shape of the bounding box is a quadrangle, but may be a simple shape other than a quadrangle such as an ellipse, or may be a complicated shape such as a polygon. In addition, the shape surrounding an object may be a contour line of the object in units of pixels in an image.

Note that the present technology is applied to any robot as long as the robot autonomously moves as represented by a security robot, a transport robot, a cleaning robot, a drone, or the like.

Furthermore, in the present technology, both the second embodiment and the third embodiment can be applied.

4. Others

Effects

In the present technology, the presence area of an object and the number of objects are estimated on the basis of a captured image, and point cloud data is generated from distance measurement information acquired by a distance measuring sensor. The point cloud to be clustered in the generated point cloud data and the number of clusters are determined on the basis of the estimated presence area of the object and the estimated number of objects, and clustering is performed on the point cloud data, so that the object is recognized.

This makes it possible to improve the efficiency and accuracy of clustering.

According to the first embodiment of the present technology, in object detection based on a machine learning method, the center position of an object, the presence area of the object, and the number of objects are estimated, the estimated center position is set to the cluster center at the start of point cloud clustering, the point cloud to be clustered is limited to the point cloud included in the presence area of the object, and the number of clusters is determined on the basis of the estimated number of objects.

Accordingly, by selecting an appropriate clustering starting point, the time required for convergence of a point cloud to a cluster is shortened, and the point cloud to be clustered is deleted. As a result, the amount of processing of clustering is reduced, and clusters are generated with an appropriate number of clusters without excess or deficiency. That is, the clustering process is made efficient, and the accuracy in generating clusters is improved.

According to the second embodiment of the present technology, in the object detection based on the machine learning method, as the number of objects to be recognized in real time is limited to the minimum, the object detection is grouped into object detection with shortened detection time and object detection in which the number of types of objects to be intermittently recognized is increased and a longer detection time is required.

As a result, even if the number of types of objects to be recognized increases, it is possible to avoid an increase in time required for recognizing an object to be recognized in real time.

According to the third embodiment of the present technology, in the object detection based on the machine learning method, the object detection is grouped into the object detection in which the object estimation accuracy is low but the detection time is short and the object detection in which the object estimation accuracy is high but a longer detection time is required. The object detection result with low estimation accuracy is normally used, and the object detection result with high estimation accuracy is used as necessary.

As a result, even in the environment in which spaces with different required object estimation accuracies of object detection are mixed, the increase in the time required for object recognition can be avoided as much as possible.

<Configuration Example of Computer>

The series of processing described above can be performed by hardware or software. In a case where the series of processing is performed by software, a program constituting the software is installed from a program recording medium to a computer incorporated in dedicated hardware, a general-purpose personal computer, or the like.

FIG. 26 is a block diagram illustrating a configuration example of hardware of a computer that executes a program to perform the series of processing described above.

A central processing unit (CPU) 301, a read only memory (ROM) 302, and a random access memory (RAM) 303 are mutually connected by a bus 304.

An input/output interface 305 is further connected to the bus 304. An input unit 306 including a keyboard, a mouse, and the like, and an output unit 307 including a display, a speaker, and the like are connected to the input/output interface 305. Furthermore, a storage unit 308 including a hard disk, a nonvolatile memory, or the like, a communication unit 309 including a network interface or the like, and a drive 310 that drives a removable medium 311 are also connected to the input/output interface 305.

In the computer configured as described above, for example, the CPU 301 loads a program stored in the storage unit 308 into the RAM 303 via the input/output interface 305 and the bus 304 and executes the program, so that the series of processing described above is performed.

The program executed by the CPU 301 is provided, for example, by being recorded in the removable medium 311 or via wired or wireless transmission medium such as a local area network, the Internet, or digital broadcasting, and is installed in the storage unit 308.

Note that the program executed by the computer may be a program in which processing is performed in time series in the order described in the present specification, or may be a program in which processing is performed in parallel or at a necessary timing such as when a call is made.

Note that, in the present specification, a system means a set of a plurality of components (devices, modules (parts), and the like), and it does not manner whether or not all the components are in the same housing. Accordingly, the system includes a plurality of devices housed in separate housings and connected via a network and one device in which a plurality of modules is housed in one housing.

Furthermore, the effects described in the present specification are merely examples and are not limited, and other effects may be obtained.

The embodiments of the present technology are not limited to the embodiments described above, and various changes can be made without departing from the gist of the present technology.

For example, the present technology can have a configuration of cloud computing in which one function is shared and processed in cooperation by a plurality of devices via a network.

Furthermore, each step described in the flowcharts described above can be performed by one device or can be shared and performed by a plurality of devices.

Furthermore, in a case where a plurality of processes is included in one step, the plurality of processes included in the one step can be performed by one device or can be shared and performed by a plurality of devices.

<Combination Example of Configurations>

Note that the present technology can also have the following configurations.

(1)

An information processing apparatus including:

an object detection unit that estimates a presence area of an object and a number of objects on the basis of a captured image;

a signal processing unit that generates point cloud data from distance measurement information acquired by a distance measuring sensor; and an object recognition unit that recognizes the object by determining a point cloud, which is a target of clustering, in the point cloud data generated and a number of clusters on the basis of the presence area of the object and the number of the objects, which are estimated, and performing clustering on the point cloud data.

(2)

The information processing apparatus according to (1), in which the object detection unit further estimates a center position of the object, and the object recognition unit further determines a starting point at which clustering starts on the basis of the center position of the object estimated.

(3)

The information processing apparatus according to (2), in which the object detection unit estimates a center position of the object using a method based on machine learning, and the object recognition unit determines the starting point on the basis of the center position of the object estimated.

(4)

The information processing apparatus according to (3), in which the object detection unit estimates a center position of an object according to the method based on machine learning.

(5)

The information processing apparatus according to (3), in which the object detection unit estimates a center position of an object based on a movement space.

(6)

The information processing apparatus according to (1) or (2), in which the object recognition unit performs the clustering using a non-hierarchical clustering method.

(7)
The information processing apparatus according to (1) or (2), in which
the object detection unit estimates a number of the objects using a method based on machine learning, and
the object recognition unit determines the number of clusters on the basis of the number of the objects estimated.

(8)
The information processing apparatus according to (1) or (2), in which
the object detection unit estimates a presence area of the objects using a method based on machine learning, and
the object recognition unit determines a point cloud that is a target of the clustering on the basis of the presence area of the object estimated.

(9)
The information processing apparatus according to (1) or (2), in which
the object detection unit determines a priority of the object on the basis of a type of the object or a position of the object.

(10)
The information processing apparatus according to (9), in which
the object recognition unit determines a point cloud that is a target of the clustering on the basis of a priority of the object.

(11)
The information processing apparatus according to (9), in which
the object recognition unit excludes a point cloud in a presence area of an object separated by a predetermined distance or longer from a target of clustering.

(12)
The information processing apparatus according to (9), in which
the object detection unit includes two or more detectors that detect objects with different priorities at different frequencies.

(13)
The information processing apparatus according to (11), in which
the object recognition unit recognizes an object with high priority at a higher frequency than a recognition frequency of an object with low priority.

(14)
The information processing apparatus according to (2), in which
the object detection unit includes
two or more detectors with different detection accuracies, and
a comparison unit that compares detection results detected by the individual detectors, and
the comparison unit outputs any one of detection results of the individual detectors to the object recognition unit on the basis of a comparison result.

(15)
The information processing apparatus according to (14), in which
in a case where the comparison result indicates mismatch, the object detection unit outputs a detection result of the detector with higher detection accuracy to the object recognition unit.

(16)
The information processing apparatus according to (14), in which
in a case where the comparison result indicates mismatch, the object recognition unit performs the clustering again on the basis of a detection result of the detector with higher detection accuracy.

(17)
The information processing apparatus according to (14), in which
a detection frequency of the detector with lower detection accuracy is higher than a detection frequency of the detector with higher detection accuracy.

(18)
The information processing apparatus according to any one of (1) to (17), in which
the information processing apparatus is included in a mobile device.

(19)
An information processing method including causing an information processing apparatus to
estimate a presence area of an object and a number of objects on the basis of a captured image;
generate point cloud data from distance measurement information acquired by a distance measuring sensor; and
recognize the object by determining a point cloud, which is a target of clustering, in the point cloud data generated and a number of clusters on the basis of the presence area of the object and the number of the objects, which are estimated, and performing clustering on the point cloud data.

(20)
A program that causes a computer to function as:
an object detection unit that estimates a presence area of an object and a number of objects on the basis of a captured image;
a signal processing unit that generates point cloud data from distance measurement information acquired by a distance measuring sensor; and
an object recognition unit that recognizes the object by determining a point cloud, which is a target of clustering, in the point cloud data generated and a number of clusters on the basis of the presence area of the object and the number of the objects, which are estimated, and performing clustering on the point cloud data.

REFERENCE SIGNS LIST

11 Autonomous mobile robot system
21 Image sensor
22 Image sensor signal processing unit
23 Object detection unit
24 Distance measuring sensor
25 Distance measuring sensor signal processing unit
26 Object recognition unit
27 Environment map creating unit
28 IMU
29 Self-position estimation unit
30 Action planning unit
31 Actuator
41 Clustering initial value calculation unit
42 Clustering processing unit
43 Object information generation unit
111 Autonomous mobile robot system
121 Object detection unit
141 Priority object detector
142 Non-priority object detector
143 Detection result output unit
211 Autonomous mobile robot system 221 Object detection unit
222 Object recognition unit
241 Object detector with low estimation accuracy
242 Object detector with high estimation accuracy
243 Detection result comparing and outputting unit

The invention claimed is:

1. An information processing apparatus, comprising:
a central processing unit (CPU) configured to:
estimate a presence area of an object, a number of objects, and a center position of the object based on a captured image;
generate point cloud data from distance measurement information acquired by a distance measuring sensor;
determine a point cloud, which is a target of a clustering process, in the generated point cloud data;
determine a number of clusters based on a basis of the estimated presence area of the object and the estimated number of the objects;
determine a starting point for the clustering process based on the estimated center position of the object; and
execute the clustering process on the point cloud data to recognize the object.

2. The information processing apparatus according to claim 1, wherein
the CPU is further configured to:
estimate the center position of the object based on a machine-learning method, and
determine the starting point based on the estimated center position of the object.

3. The information processing apparatus according to claim 1, wherein the CPU is further configured to estimate the center position of the object based on a movement space.

4. The information processing apparatus according to claim 1, wherein the CPU is further configured to execute the clustering process based on a non-hierarchical clustering method.

5. The information processing apparatus according to claim 1, wherein
the CPU is further configured to:
estimate a number of the objects based on a machine-learning method, and
determine the number of clusters based on the estimated number of the objects.

6. The information processing apparatus according to claim 1,
wherein
the CPU is further configured to:
estimate a presence area of the number of objects based on a machine-learning method, and
determine the point cloud that is the target of the clustering process based on the estimated presence area of the number of objects.

7. The information processing apparatus according to claim 1, wherein the CPU is further configured to determine a priority of the object based on one of a type of the object or a position of the object.

8. The information processing apparatus according to claim 7, wherein the CPU is further configured to determine the point cloud that is the target of the clustering process based on the priority of the object.

9. The information processing apparatus according to claim 7, wherein the CPU is further configured to exclude the point cloud in a presence area of an object that is separated by a specific distance or longer from a target of the clustering process.

10. The information processing apparatus according to claim 7, wherein the CPU is further configured to include two or more detectors that detect the number of the objects with different priorities at different frequencies.

11. The information processing apparatus according to claim 9, wherein the CPU is further configured to recognize the object with high priority at a higher frequency than a recognition frequency of an object with low priority.

12. The information processing apparatus according to claim 1, wherein the CPU is further configured to:
include two or more detectors with different detection accuracies,
compare detection results detected by the two or more detectors, and
output any one of the detection results of the two or more detectors based on a comparison result.

13. The information processing apparatus according to claim 12, wherein in a case where the comparison result indicates mismatch, the CPU is further configured to output a detection result with higher detection accuracy.

14. The information processing apparatus according to claim 12, wherein in a case where the comparison result indicates mismatch, the CPU is further configured to execute the clustering process again based on a detection result with higher detection accuracy.

15. The information processing apparatus according to claim 12, wherein a detection frequency of a detector among the two or more detectors with lower detection accuracy is higher than a detection frequency of a detector among the two or more detectors with higher detection accuracy.

16. The information processing apparatus according to claim 1, wherein the information processing apparatus is included in a mobile device.

17. An information processing method, comprising:
in an information processing apparatus:
estimating, by a central processing unit (CPU), a presence area of an object, a number of objects, and a center position of the object based on a captured image;
generating, by the CPU, point cloud data from distance measurement information acquired by a distance measuring sensor;
determining, by the CPU, a point cloud, which is a target of a clustering process, in the generated point cloud data;
determining, by the CPU, a number of clusters based on the estimated presence area of the object and the estimated number of the objects;
determining, by the CPU, a starting point for the clustering process based on the estimated center position of the object; and
executing, by the CPU, the clustering process on the point cloud data to recognize the object.

18. A non-transitory computer readable medium, having stored thereon, computer executable code, which when executed by a processor, cause the processor to execute operations, the operations:
estimating a presence area of an object, a number of objects, and a center position of the object based on a captured image;
generating point cloud data from distance measurement information acquired by a distance measuring sensor;
determining a point cloud, which is a target of a clustering process, in the generated point cloud data;
determining a number of clusters based on the estimated presence area of the object and the estimated number of the objects;

determining a starting point for the clustering process based on the estimated center position of the object; and executing the clustering process on the point cloud data to recognize the object.

\* \* \* \* \*